(12) United States Patent  
Endoh

(10) Patent No.: US 6,999,405 B2  
(45) Date of Patent: Feb. 14, 2006

(54) OPTICAL RECORDING MEDIUM, MASTER DISC FOR THE PREPARATION OF THE OPTICAL RECORDING MEDIUM AND OPTICAL RECORDING AND/OR REPRODUCING APPARATUS

(75) Inventor: Sohmei Endoh, Miyagi (JP)

(73) Assignee: Sony Corporation, Tokyo (JP)

( * ) Notice: Subject to any disclaimer, the term of this patent is extended or adjusted under 35 U.S.C. 154(b) by 108 days.

(21) Appl. No.: 10/823,614

(22) Filed: Apr. 14, 2004

(65) Prior Publication Data

US 2004/0202056 A1 Oct. 14, 2004

Related U.S. Application Data

(62) Division of application No. 09/849,278, filed on May 7, 2001, now Pat. No. 6,791,938.

(30) Foreign Application Priority Data

May 10, 2000 (JP) .............................. 2000-137808  
May 10, 2000 (JP) .............................. 2000-137809

(51) Int. Cl.  
*G11B 7/24* (2006.01)

(52) U.S. Cl. ................................ 369/275.4; 369/111  
(58) Field of Classification Search ................ None  
See application file for complete search history.

(56) References Cited

U.S. PATENT DOCUMENTS

| 4,556,967 | A | 12/1985 | Braat |
| 5,422,874 | A | 6/1995 | Birukawa et al. |
| 5,463,614 | A | 10/1995 | Morita |
| 5,553,051 | A | 9/1996 | Sugiyama et al. |
| 5,602,824 | A | 2/1997 | Ooki et al. |
| 5,909,412 | A | 6/1999 | Nakayama et al. |
| 5,995,458 | A | 11/1999 | Itoi |
| 6,335,916 | B1 | 1/2002 | Endo et al. |
| 6,487,164 | B1 * | 11/2002 | Endoh et al. ............ 369/275.4 |
| 6,577,566 | B1 | 6/2003 | Tomita |

FOREIGN PATENT DOCUMENTS

| EP | 0 752 701 | 1/1997 |
| EP | 0 813 189 | 12/1997 |
| EP | 0 884 722 | 12/1998 |

* cited by examiner

*Primary Examiner*—Thang V. Tran  
(74) *Attorney, Agent, or Firm*—Oblon, Spivak, McClelland, Maier & Neustadt, P.C.

(57) ABSTRACT

An optical recording medium used as a recording medium for information signals in which, in forming a groove along a recording track, a first groove and a second groove are formed to a first depth x to describe a double helix and a third groove having a second depth y shallower than the first depth x is formed between the first and second groves describing double helices. By setting the phase depths of these grooves to a pre-set range, signals required for tracking servo or seek are obtained to sufficient levels to realize stable tracking servo and seek.

11 Claims, 7 Drawing Sheets

OPTICAL RECORDING MEDIUM, MASTER DISC FOR THE PREPARATION OF THE OPTICAL RECORDING MEDIUM AND OPTICAL RECORDING AND/OR REPRODUCING APPARATUS

This application is a divisional application of, and claims priority under 35 U.S.C. § 120 to parent application Ser. No. 09/849,278, filed May 7, 2001, now U.S. Pat. No. 6,791,938.

BACKGROUND OF THE INVENTION

1. Field of the Invention

This invention relates to an optical recording medium, having a groove formed along a recording track, a master disc used for the preparation of the optical recording medium, and to an optical recording and/or reproducing apparatus for recording and/or reproducing information signals for an optical recording medium prepared using this master disc.

2. Description of Related Art

As an optical recording medium, an optical disc for optically recording and/or reproducing information signals is being practically used. Among such optical recording mediums, there are a replay-only optical disc having embossed pits corresponding to data, previously formed on a disc substrate, a magneto-optical disc for recording data by exploiting photomagnetic effects, and a phase-change optical disc for recording data by exploiting phase changes in a recording film.

Of these optical discs, those which permit writing, such as magneto-optical disc or phase-change optical disc, are usually formed with grooves extending along a recording track. By the groove herein is meant a so-called guide groove formed for extending along the recording track mainly in order to permit tracking servo. An area between neighboring grooves is termed a land.

In an optical disc, carrying these grooves, tracking servo is performed based on push-pull signals obtained from light reflected and diffracted by the grooves. The push-pull signals are obtained by detecting the light reflected and diffracted by the groove by two photodetectors, arranged symmetrically with respect to the track center, and by taking the difference between the outputs of the two photodetectors.

In these optical discs, a high recording density was achieved by improving the playback resolution of an optical pickup loaded on a reproducing apparatus. For improving the playback resolution of an optical pickup, a shorter wavelength λ of the laser light is used for data playback or a larger numerical aperture NA of an optical lens is used for converging the laser light on the optical disc.

The wavelength λ of the laser light used for data playback, the numerical aperture NA of the optical lens and the values of the track pitch are shown for CD, MD, MDData2, DVD-RW and DVD-ROM are shown in Table 1. It is noted that CD, MD, MDData2, DVD-RW and DVD-ROM are all trademarks for different types of the optical discs.

TABLE 1

| | laser wavelength [nm] | NA | track pitch [nm] |
|---|---|---|---|
| CD and MD | 780 | 0.45 | 1600 |
| DVD-ROM | 650 | 0.60 | 740 |
| DVD-RW | 650 | 0.60 | 800 |
| MD Data2 | 650 | 0.52 | 950 |

In a conventional optical disc, in order to achieve a high recording density, a narrow track width was realized by shortening the wavelength λ of the laser light or by enlarging the numerical aperture NA of the optical lens, as shown in Table 1.

Meanwhile, in the conventional optical disc, the track pitch is on the order of ½ to ⅔ of the cut-off frequency of the optical pickup of the reproducing apparatus. The cut-off frequency herein means a frequency for which the amplitude of the playback signal is approximately 0. It is noted that the cut-off frequency is represented by 2NA/λ, where λ is the wavelength of the laser light used for data reproduction and NA is the numerical aperture of an optical lens used for converging the laser light on an optical disc.

The reason the track pitch is on the order of ½ to ⅔ of the cut-off frequency is that, for realizing stable tracking servo or track seek, it is necessary to achieve a sufficiently high level of a signal required for tracking servo or seek.

For example, in an optical disc in which information signals are of high density, push-pull signals are used as tracking error signals. If desired to achieve stable tracking servo, the amplitude ratio of push-pull signals needs to be on the order of 0.14 or higher. Also, cross-track signals are used for traverse counting in seeking and for detecting track radial positions. For stable seek, a cross track signal amplitude needs to be on the order of 0.06 or more. If, in a conventional optical disc, the amplitude ratio of the push-pull signal is to be 0.14 or more and the cross track signal amplitude is to be 0.06 or more, the track pitch has to be on the order of ½ to ⅔ of the cut-off frequency.

Meanwhile, a push-pull signal is obtained by detecting light reflected and diffracted by a groove by two photodetectors A, B arranged symmetrically with respect to the track center and by taking a difference (A–B) of outputs from the two photodetectors A and B, as shown in FIG. 1. The cross-track signals are obtained by taking the sum of outputs of these two photodetectors A and B.

The amplitude ratio of the push-pull signals is represented by C/Mmax, where C is the maximum amplitude of the push-pull signal, as shown in FIG. 2. The maximum amplitude ratio of cross-track signals is represented by D/Mmax, as shown in FIG. 2, where D is the maximum amplitude of cross-track signals and Mmax is the maximum value of a sum signal M of signals from the two photodetectors A and B, that is the value of the sum signal M on the mirror surface of the disc.

Meanwhile, in an optical recording medium, such as an optical disc, it is desired to raise the recording density of the recording signals further. To this end, it suffices to narrow the gap between neighboring grooves to narrow down the track pitch. However, if, in a conventional optical recording medium, the track pitch is too narrow, the signals necessary for tracking servo or seek cannot be obtained with a sufficient level, such that stable tracking servo or seek cannot be achieved.

For example, in MD Data2, the track pitch is 0.95 μm, with the push-pull signal amplitude ratio being on the order of 0.30. In such case, the push-pull signal amplitude ratio is large to permit stable tracking servo to be achieved. However, if, in a configuration similar to that of the MD Data2, the track pitch is 0.75 μm, the push-pull signal amplitude ratio is as low as approximately 0.07. This push-pull signal amplitude ratio is too low to realize stable tracking servo.

If, in a configuration similar to one of MD Data2, the track pitch is set to 0.75 μm, the push-pull signal amplitude ratio is as low as approximately 0.06, while the cross-track amplitude ratio is as low as approximately 0.05. These values of the push-pull signal amplitude ratio and the cross-track amplitude ratio are to low to realize stable tracking servo or seek.

Thus, in a conventional optical recording medium, if the track pitch is too narrow, it becomes impossible to achieve signals required for tracking servo or seek with a sufficient level, such that stable tracking servo or seek cannot be achieved, with the result that, with the conventional optical recording medium, the recording density cannot be improved further.

OBJECT AND SUMMARY OF THE INVENTION

It is therefore an object of the present invention to provide an optical recording medium, a master disc used for the preparation of the optical recording medium and an optical recording and/or reproducing apparatus for recording and/or reproducing information signals for such an optical recording medium, in which tracking servo or seek can be achieved in stability even if the track pitch is reduced to an extremely small value.

In one aspect, the present invention provides an optical recording medium in which a groove is formed for extending along a recording track and in which the light with a wavelength λ is illuminated for recording and/or reproduction, wherein, as such groove, a first groove and a second groove are formed to a first depth to describe a double helix, and wherein a third groove having a second depth shallower than the first depth is formed between the first and second groves describing double helices.

In this optical recording medium, in which the third groove having a second depth shallower than the first depth is formed between the first and second groves describing double helices, the bottom of the third groove is substantially flat, so that optimum signals required for tracking servo and seek may be acquired.

In this optical recording medium, if a phase depth of the first and second grooves represented by $x \times n_x/\lambda$, x being the first depth and $n_x$ being a refractive index of a medium from the light incident surface to the first and second grooves, is X, and if a phase depth of the third groove represented by $y \times n_y/\lambda$, y being the second depth and $n_y$ being a refractive index of a medium from the light incident surface to the third groove, is Y, the first, second and third grooves are set for satisfying the equations (1) to (3) or the equations (4) and (5):

$$Y \geq 36.9189 - 208.0190X + 294.3845X^2 \tag{1}$$

$$Y \geq -1.2977 + 8.2017X - 15.8226X^2 + 12.3273X^3 \tag{2}$$

$$Y \leq -214.05681 + 2423.29342X - 10933.24673X^2 + 24597.79851 X^3 - 27576.99399X^4 + 12319.79865X^5 \tag{3}$$

$$Y \geq -4.6463 + 30.2156X - 64.3100X^2 + 47.1308X^3 \tag{4}$$

$$Y \leq 2.7669 - 20.0529X + 48.0353X^2 - 35.4870X^3 \tag{5}$$

In this case, since the first to third grooves are formed to satisfy the above equations (1) to (3) or the equations (4) and (5), the signals required for tracking servo or seek may be acquired at sufficient levels even if the track pitch is diminished.

The first to third grooves are preferably formed to satisfy the following equations (6) and (7) or (8) and (9):

$$Y \geq 0.8680 - 7.3968X + 21.8561X^2 - 17.5125X^3 \tag{6}$$

$$Y \leq -261.77076 + 3646.50412X - 20988.26504X^2 + 63944.54992 X^3 - 108758.21706X^4 + 97951.29191X^5 - 36518.20328X^6 \tag{7}$$

$$Y \geq 10.2606 - 60.3765X + 118.5901X^2 - 75.9408X^3 \tag{8}$$

$$Y \leq -6.8296 + 29.9281X - 38.6228X^2 + 14.0747X^3 \tag{9}.$$

In this case, since the first to third grooves are formed to satisfy the above equations (6) and (7) or the equations (8) and (9), the signals required for tracking servo or seek may be acquired at sufficient levels.

Moreover, the first to third grooves are preferably formed to satisfy the following equations (10), (11) and (12):

$$Y \geq 0.8680 - 7.3968X + 21.856X^2 - 17.5125X^3 \tag{10}$$

$$Y \geq 36.9189 - 208.0190X + 294.3845X^2 \tag{11}$$

$$Y \leq -214.05681 + 2423.29342X - 10933.24673X^2 + 24597.79851 X^3 - 27576.99399X^4 + 12319.79865X^5 \tag{12}.$$

In this optical recording medium, since the first to third grooves are formed to satisfy the above equations (10), (11) and (12), the signals required for tracking servo or seek may be acquired at sufficient levels.

Meanwhile, in these optical recording mediums, at least one of the first and second grooves is preferably such a wobbling groove formed so that at least a portion thereof is meandered. This allows to add the address information to no other than the grooves.

In another aspect, the present invention provides a master disc for the preparation of an optical recording medium which has a groove formed along a recording track and which is illuminated by the light with a wavelength λ for recording and/or reproduction, wherein, as a crest-and-groove pattern corresponding to such groove, a first groove pattern and a second groove pattern are formed to a first depth to describe a double spiral, and wherein a third groove pattern having a second depth shallower than the first depth is formed between the first and second groove patterns describing double spiral.

In this master disc for the preparation of the optical recording medium, in which the third groove pattern having the second depth shallower than the first depth is formed between the first and second groove patterns of the first depth describing the double helix, the bottom surface of the third groove pattern is substantially flat. In the optical recording medium, prepared using this master disc for the preparation of the optical recording medium, in which the third groove pattern having the second depth shallower than the first depth is formed between the first and second groove patterns of the first depth describing the double helix, with the bottom surface of the third groove pattern being substantially flat, the signals required for tracking servo or seek can be optimally acquired. So, with the present master disc for the preparation of the optical recording medium, an optical recording medium may be produced in which it is possible to optimally produce signals required for tracking servo and seek.

With the present master disc for the preparation of the optical recording medium, if a phase depth of the first and second groove patterns represented by $x \times n_x/\lambda$, x being the first depth and $n_x$ being a refractive index of a medium from the light incident surface to the first and second grooves, is X, and if a phase depth of the third groove pattern represented by $y \times n_y/\lambda$, y being the second depth and $n_y$ being a refractive index of a medium from the light incident surface to the third groove, is Y, the first, second and third groove patterns are set for satisfying the equations (1) to (3) or the equations (4) and (5):

$$Y \geq 36.9189 - 208.0190X + 294.3845X^2 \tag{1}$$

$$Y \geq -1.2977 + 8.2017X - 15.8226X^2 + 12.3273X^3 \tag{2}$$

$$Y \leq -214.05681+2423.29342X-10933.24673X^2+24597.79851X^3-27576.99399X^4+12319.79865X^5 \quad (3)$$

$$Y \geq -4.6463+30.2156X-64.3100X^2+47.1308X^3 \quad (4)$$

$$Y \leq 2.7669-20.0529X+48.0353X^2-35.4870X^3 \quad (5).$$

In this case, since the first to third groove patterns are formed to satisfy the above equations (1) to (3) or the equations (4) and (5), it is possible to produce an optical recording medium having formed thereon the first to third grooves satisfying the above equations (1) to (3) or the equations (4) and (5) by using the present master disc for the preparation of the optical recording medium. Thus, with the present master disc for the preparation of the optical recording medium, it is possible to produce an optical recording medium in which the signals required for tracking servo or seek can be acquired at sufficient levels even with a narrow track pitch.

On the other hand, the first to third groove patterns are preferably formed to satisfy the following equations (6) and (7) or the following equations (8) and (9):

$$Y \geq 0.8680-7.3968X+21.8561X^2-17.5125X^3 \quad (6)$$

$$Y \leq -261.77076+3646.50412X-20988.26504X^2+63944.54992X^3-108758.21706X^4+97951.29191X^5-36518.20328X^6 \quad (7)$$

$$Y \geq 10.2606-60.3765X+118.5901X^2-75.9408X^3 \quad (8)$$

$$Y \leq -6.8296+29.9281X-38.6228X^2+14.0747X^3 \quad (9).$$

In the present master disc for the preparation of the optical recording medium, in which the first to third groove patterns are preferably formed to satisfy the following equations (6) and (7) or the following equations (8) and (9), an optical recording medium having formed thereon the first to third grooves satisfying the equations (6) and (7) or the equations (8) and (9) may be produced with the use of the present master disc for the preparation of the optical recording medium. Thus, with the present master disc for the preparation of the optical recording medium, it is possible to produce an optical recording medium in which the signals required for tracking servo or seek can be acquired at sufficient levels even with a narrow track pitch.

Moreover, the first to third groove patterns are preferably formed to satisfy the following equations (10), (11) and (12):

$$Y \geq 0.8680-7.3968X+21.856X^2-17.5125X^3 \quad (10)$$

$$Y \geq 36.9189-208.0190X+294.3845X^2 \quad (11)$$

$$Y \leq -214.05681+2423.29342X-10933.24673X^2+24597.79851X^3-27576.99399X^4+12319.79865X^5 \quad (12).$$

In the present master disc for the preparation of the optical recording medium, in which the first to third groove patterns are preferably formed to satisfy the equations (10), (11) and (12), an optical recording medium having formed thereon the first to third grooves satisfying the equations (10), (11) and (12) may be produced with the use of the present master disc for the preparation of the optical recording medium. Thus, with the present master disc for the preparation of the optical recording medium, it is possible to produce an optical recording medium in which the signals required for tracking servo or seek can be acquired at sufficient levels despite a narrow track pitch.

Meanwhile, in these optical recording mediums, at least one of the first and second grooves is a wobbling groove formed so that at least a portion thereof is meandered.

This allows to produce an optical recording medium in which at least one of the first and second grooves is a wobbling groove at least a portion of which is meandered. With the optical recording medium, thus prepared, the address information can be added to no other than the grooves.

In another aspect, the present invention provides an optical recording and/or reproducing apparatus for recording and/or reproducing the information by illuminating the light with a wavelength λ on an optical recording medium having a groove formed along a recording track, wherein the optical recording medium is such a one in which, as the groove, a first groove and a second groove are formed to a first depth to describe a double helix and n which a third groove having a second depth shallower than the first depth is formed between the first and second groves describing double helices.

With the present optical recording and/or reproducing apparatus, in which a third groove having a second depth shallower than the first depth is formed between the first and second groves describing double helices, the bottom of the third groove of the optical recording medium is substantially flat to allow to produce the signals required for tracking servo or seek.

In the present optical recording and/or reproducing apparatus, if a phase depth of the first and second grooves represented by $x \times n_x/\lambda$, x being the first depth and $n_x$ being a refractive index of a medium from the light incident surface to the first and second grooves, is X, and if a phase depth of the third groove represented by $y \times n_y/\lambda$, y being the second depth and $n_y$ being a refractive index of a medium from the light incident surface to the third groove, is Y, the first, second and third grooves are set for satisfying the equations (1) to (3) or the equations (4) and (5):

$$Y \geq 36.9189-208.0190X+294.3845X^2 \quad (1)$$

$$Y \geq -1.2977+8.2017X-15.8226X^2+12.3273X^3 \quad (2)$$

$$Y \leq -214.05681+2423.29342X-10933.24673X^2+24597.79851X^3-27576.99399X^4+12319.79865X^5 \quad (3)$$

$$Y \geq -4.6463+30.2156X-64.3100X^2+47.1308X^3 \quad (4)$$

$$Y \leq 2.7669-20.0529X+48.0353X^2-35.4870X^3 \quad (5).$$

Since the first to third grooves of the optical recording medium are formed to satisfy the above equations (1) to (3) or the equations (4) and (5), the signals required for tracking servo or seek can be obtained with sufficient levels, even with a narrow track pitch.

Alternatively, the first to third grooves of the optical recording medium are preferably formed to satisfy the following equations (6) and (7) or the equations (8) and (9):

$$Y \geq 0.8680-7.3968X+21.8561X^2-17.5125X^3 \quad (6)$$

$$Y \leq -261.77076+3646.50412X-20988.26504X^2+63944.54992X^3-108758.21706X^4+97951.29191X^5-36518.20328X^6 \quad (7)$$

$$Y \geq 10.2606-60.3765X+118.5901X^2-75.9408X^3 \quad (8)$$

$$Y \leq -6.8296+29.9281X-38.6228X^2+14.0747X^3 \quad (9).$$

In the present optical recording and/or reproducing apparatus, in which the first to third grooves of the optical recording medium are formed to satisfy the equations (6) and (7) or the equations (8) and (9), the signals required for tracking servo or seek can be obtained with sufficient levels, even with a narrow track pitch.

Alternatively, the first to third grooves of the optical recording medium are preferably formed to satisfy the following equations (10) to (12):

$$Y \geq 0.8680 - 7.3968X + 21.856X^2 - 17.5125X^3 \quad (10)$$

$$Y \geq 36.9189 - 208.0190X + 294.3845X^2 \quad (11)$$

$$Y \leq -214.05681 + 2423.29342X - 10933.24673X^2 + 24597.79851X^3 - 27576.99399X^4 + 12319.79865X^5 \quad (12).$$

In the present optical recording and/or reproducing apparatus, in which the first to third grooves of the optical recording medium are formed to satisfy the equations (10) to (12), the signals required for tracking servo or seek can be obtained with sufficient levels, even with a narrow track pitch.

Meanwhile, in these recording and/or reproducing apparatus, at least one of the first and second grooves is a wobbling groove formed so that at least a portion thereof is meandered. This enables the signals required for tracking servo or seek to be produced optimally.

Other objects, features and advantages of the present invention will become apparent from the following description of preferred embodiments thereof and the claims.

DESCRIPTION OF THE PREFERRED EMBODIMENTS

Figure 1:
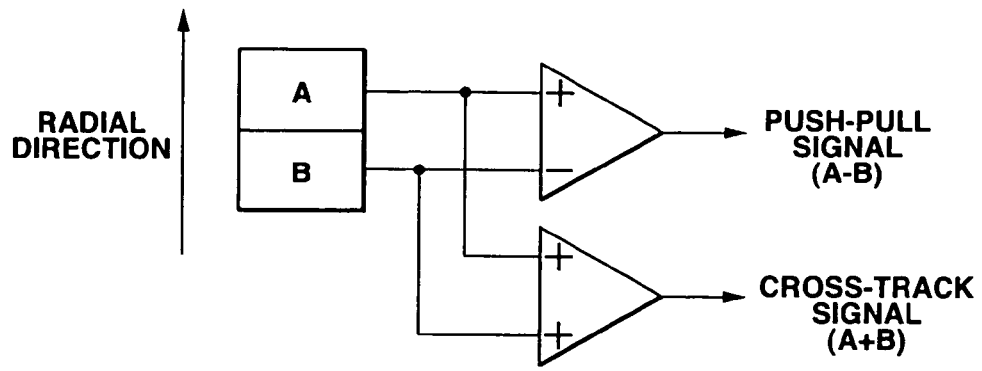
FIG. 1 illustrates a method for detecting push-pull signals and cross-track signals.
Figure 2:
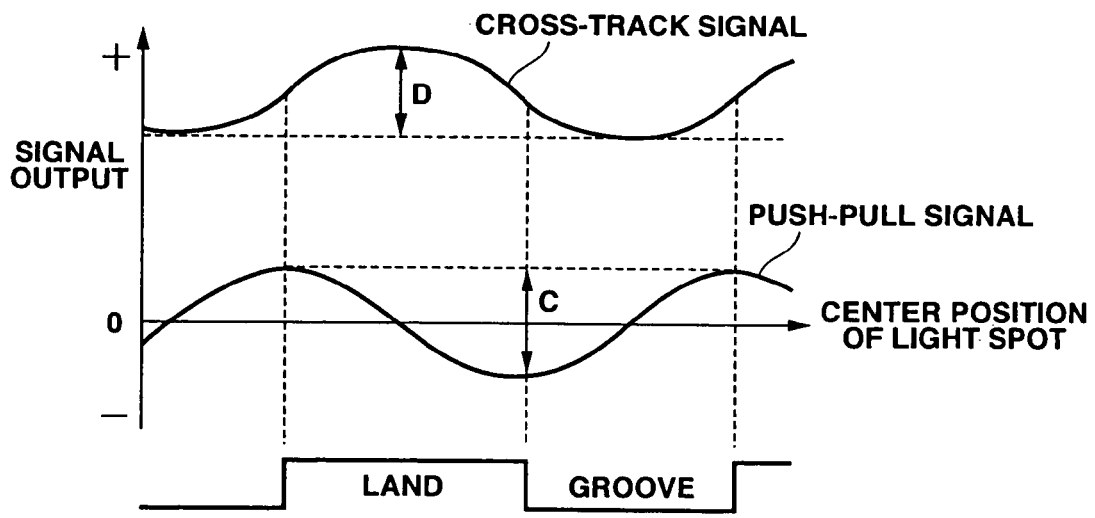
FIG. 2 illustrates the push-pull signal amplitude ratio and the cross-track signal amplitude ratio.

Referring to the drawings, an optical recording medium, a master disc used for the preparation of the optical recording medium and an optical recording and/or reproducing apparatus for recording and/or reproducing information signals for such an optical recording medium, according to the present invention, will be explained in detail.

<Magneto-Optical Disc>

First, a magneto-optical disc, an optical recording medium embodying the present invention, is explained with reference to FIGS. 3 and 4.

In a magneto-optical disc 1 according to the present invention, data is recorded by exploiting the photomagnetic effect. Referring to FIG. 3, this magneto-optical disc 1 includes a disc substrate 2, formed e.g., of polymethyl methacrylate (PMMA) or polycarbonate (PC), a recording layer 3 on which photomagnetic recording is to be made and a protective layer 4 for protecting this recording layer 3. The recording layer 3 is a sequentially layered structure made up of a dielectric film of e.g., SiN, a perpendicular magnetic recording film of e.g., TeFeCo alloys, a dielectric film of e.g., SiN and a reflecting film e.g., of Al. The protective layer 4 is a layer of a UV curable resin spin-coated on the recording layer 3. In the present invention, the structure of the recording layer 3 or the protective layer 4 may be optionally selected without being limited to the structure illustrated herein.

On the surface of the magneto-optical disc 1 carrying the recording layer 3 and the protective layer 4, a wobbling groove 5 and a straight groove 6, as guide grooves, are formed to form a double helix, that is in such a manner that these grooves 5, 6 will describe a double helix at the same depth, referred to below as a first depth x.

This wobbling groove 5 and the straight groove 6 are formed meandering at a constant period at an amplitude of ±10 nm. Thus, in the magneto-optical disc 1, the address information is appended to the groove by wobbling one of the grooves, herein the wobbling groove 5, at an amplitude of ±10 nm.

Figure 4:
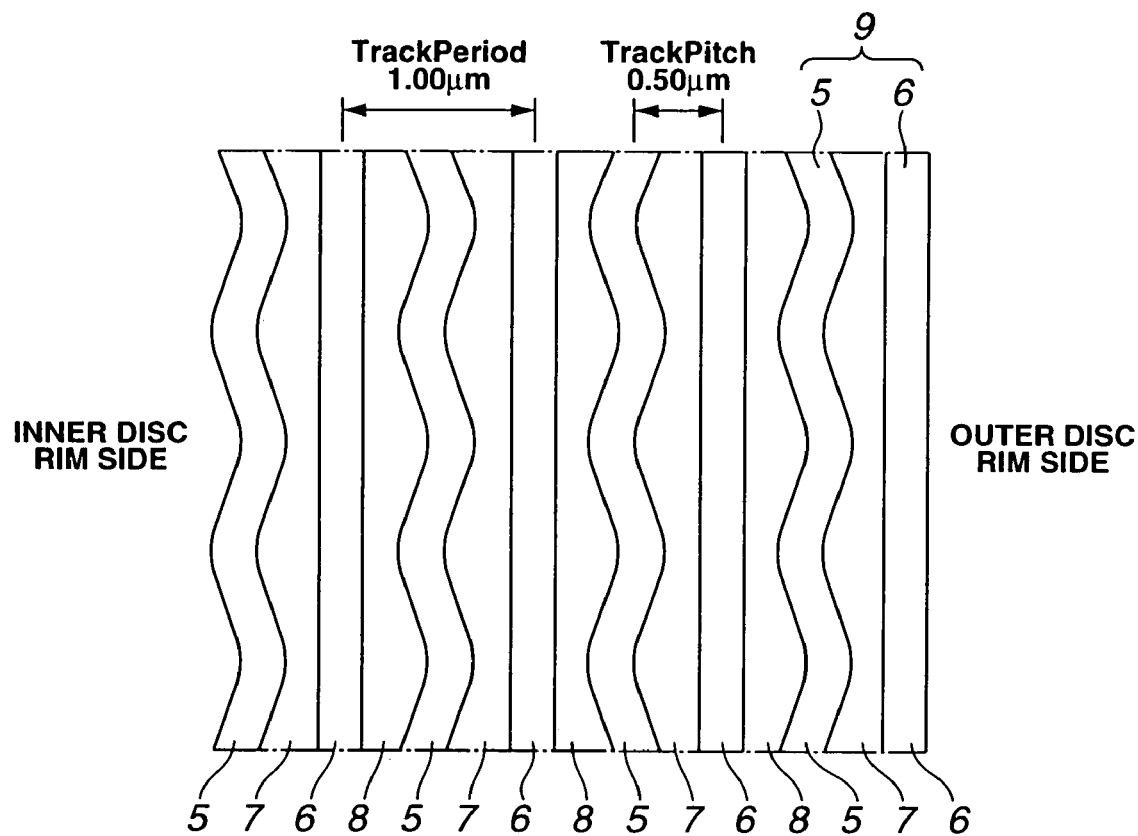
FIG. 4 is a plan view showing portion of a recording area of a typical magneto-optical disc of the present invention to an enlarged scale.

As shown in FIG. 4, in a portion of the magneto-optical disc 1 delimited between the double-helix wobbling groove 5 and the straight groove 6 and which has the wobbling groove 5 on the inner disc rim side, there is formed a shallow groove 7 of a depth shallower than the depth of the wobbling groove 5 and the straight groove 6 and which is referred to below as a second depth y.

The portion of the magneto-optical disc 1 delimited between the wobbling groove 5 and the straight groove 6 and which has the straight groove 6 on the inner disc rim side, serves as a land 8.

In the present magneto-optical disc 1, photomagnetic data recording is made in the wobbling groove 5 and in the straight groove 6, that is, recording tracks in which to record information signals are formed in the wobbling groove 5 and in the straight groove 6.

In this magneto-optical disc 1, the track pitch is 0.50 µm. The track pitch corresponds to an interval of the center lines of the straight groove 6 and the wobbling groove 5 describing the double helix. Specifically, in the present magneto-optical disc 1, the distance between the center positions of the straight groove 6 and the wobbling groove 5 is 0.50 µm.

In the following description, the interval between neighboring straight grooves 6 is termed a track period. This track period is twice the track pitch. In this magneto-optical disc 1, the track period is 1.00 µm.

In the preferred embodiment, the two grooves, namely the wobbling groove 5 and the straight groove 6, represent double helix grooves. However, in the magneto-optical disc according to the present invention, both of these grooves may be straight grooves or wobbling grooves. However, if the groove(s) are wobbled, the groove(s) per se may carry the address information. Moreover, if one of the grooves is the wobbling groove, with the other being a straight groove, track widths may be narrower than if both grooves are wobbling grooves, thus realizing a higher recording density.

Here, the recording tracks are formed in the wobbling groove 5 and in the straight groove 6. However, in the optical recording medium according to the present invention, recording tracks may be formed in the shallow groove 7 or in the land 8. Alternatively, recording tracks may be formed in the land and groove portions, as in the case of the land groove recording.

In the magneto-optical disc 1 of the present invention, the wobbling groove 5 and the straight groove 6 are formed so that the first depth x of the wobbling groove 5 and the straight groove 6 is of the same value, and so that the second depth y of the shallow groove 7 will be shallower than this first depth x.

So, with the magneto-optical disc 1, the bottom surface of the shallow groove 7 is substantially flat. Stated differently, this shallow groove 7 is protuberantly formed in a substantially trapezoidal shape from the bottom surface of the wobbling groove 5 and the straight groove 6 and is of an optimum shape to cope with the ultra resolution. So, with the present magneto-optical disc 1, signals necessary for tracking servo or seek can be produced satisfactorily.

In the following description, the wobbling groove 5 and the straight groove 6 are sometimes collectively referred to as deep grooves in contradistinction from the shallow groove 7.

In the magneto-optical disc 1 of the present invention, when the phase depth of a deep groove 9 represented by x×nx/λ, where λ is the wavelength of the laser light used for recording and/or reproducing the magneto-optical disc 1 and nx is the refractive index of the medium from the light incident surface of the magneto-optical disc 1 to the deep groove 9, and when the phase depth of the shallow groove 7 represented by y×ny/λ, where ny us the refractive index of the medium from the light incident surface of the magneto-optical disc 1 to the shallow groove 7, the deep groove 9 and the shallow groove 7 are formed so that the following equations (1-1), (1-2) and (1-3) or the following equations (1-5) and (1-6) will be met:

$$Y \geq 36.9189 - 208.0190X + 294.3845X^2 \qquad (1\text{-}1)$$

$$Y \geq -1.2977 + 8.2017X - 15.8226X^2 + 12.3273X^3 \qquad (1\text{-}2)$$

$$Y \leq -214.05681 + 2423.29342X - 10933.24673 X^2 + 24597.79851X^3 - 27576.99399X^4 + 12319.79865X^5 \qquad (1\text{-}3)$$

$$Y \geq -4.6463 + 30.2156X - 64.3100X^2 + 47.1308X^3 \qquad (1\text{-}4)$$

$$Y \leq 2.7669 - 20.0529X + 48.0353X^2 - 35.4870X^3 \qquad (1\text{-}5).$$

Meanwhile, a medium from the light incident surface of the magneto-optical disc 1 to the deep groove 9 and a medium from the light incident surface to the shallow groove 7 are both the disc substrate 2. Therefore, if the refractive index of the disc substrate 2 is n, nx=ny=n.

In the above-described magneto-optical disc 1, since the deep groove 9 and the shallow groove 7 are formed to satisfy the equations (1-1), (1-2) and (1-3) or the equations (1-4) and (1-5), the signals necessary for tracking servo or seek can be produced at a sufficient level.

Moreover, in the magneto-optical disc 1 according to the present invention, if the phase depth of the deep groove 9 represented by x×nx/λ is X, where λ is the wavelength of the laser light used for recording and/or reproducing the magneto-optical disc 1 and nx is the refractive index of the medium from the light incident surface of the magneto-optical disc to the deep groove 9, and also if the phase depth often shallow groove 7 represented by y×ny/λ is Y, where ny is the refractive index of the medium from the light incident surface of the magneto-optical disc to the shallow groove 7, the deep groove 9 and the shallow groove 7 are formed so that the following equations (1-6) and (1-7) or the following equations (1-8) and (1-9) will be satisfied:

$$Y \geq 0.8680 - 7.3968X + 21.8561X^2 - 17.5125X^3 \qquad (1\text{-}6)$$

$$Y \leq -261.77076 + 3646.50412X - 20988.26504X^2 + 63944.54992 X^3 - 108758.21706X^4 + 97951.29191X^5 - 36518.20328X^6 \qquad (1\text{-}7)$$

$$Y \geq 10.2606 - 60.3765X + 118.5901X^2 - 75.9408X^3 \qquad (1\text{-}8)$$

$$Y \leq -6.8296 + 29.9281X - 38.6228X^2 + 14.0747X^3 \qquad (1\text{-}9).$$

Meanwhile, a medium from the light incident surface of the magneto-optical disc 1 to the deep groove 9 and a medium from the light incident surface to the shallow groove 7 are both the disc substrate 2. Therefore, if the refractive index of the disc substrate 2 is n, nx=ny=n.

In the above-described magneto-optical disc, since the deep groove 9 and the shallow groove 7 are formed to satisfy the equations (1-6) and (1-7) or the equations (1-8) and (1-9), as will be apparent from the experiemtal results, as later explained, signal required for tracking servo or seek can be produced at a sufficient level.

Moreover, in the magneto-optical disc 1 of the present invention, the deep groove 9 and the shallow groove 7 are preferably formed to satisfy the following equations (1-10), (1-11) and (1-12):

$$Y \geq 0.8680 - 7.3968X + 21.8561X^{2-17.5125}X^3 \qquad (1\text{-}10)$$

$$Y \geq 36.9189 - 208.0190X + 294.3845X^2 \qquad (1\text{-}11)$$

$$Y \leq -214.05681 + 2423.29342X - 10933.24673X^2 + 24597.79851 X^3 - 27576.99399X^4 + 12319.79865X^5 \qquad (1\text{-}12)$$

In the above-described magneto-optical disc, since the deep groove 9 and the shallow groove 7 are formed to satisfy the equations (1-10), (1-11) and (1-12), as will be apparent from the experiemtal results, as later explained, signal required for tracking servo or seek can be produced at a sufficient level.

<Laser Cutting Device>

In preparing the magneto-optical disc 1, as described above, a laser cutting device is used for preparing a master disc for the preparation of the magneto-optical disc 1. An exemplary laser cutting device, used in preparing the master disc for the recording medium, is explained in detail with reference to FIG. 5.

Figure 5:
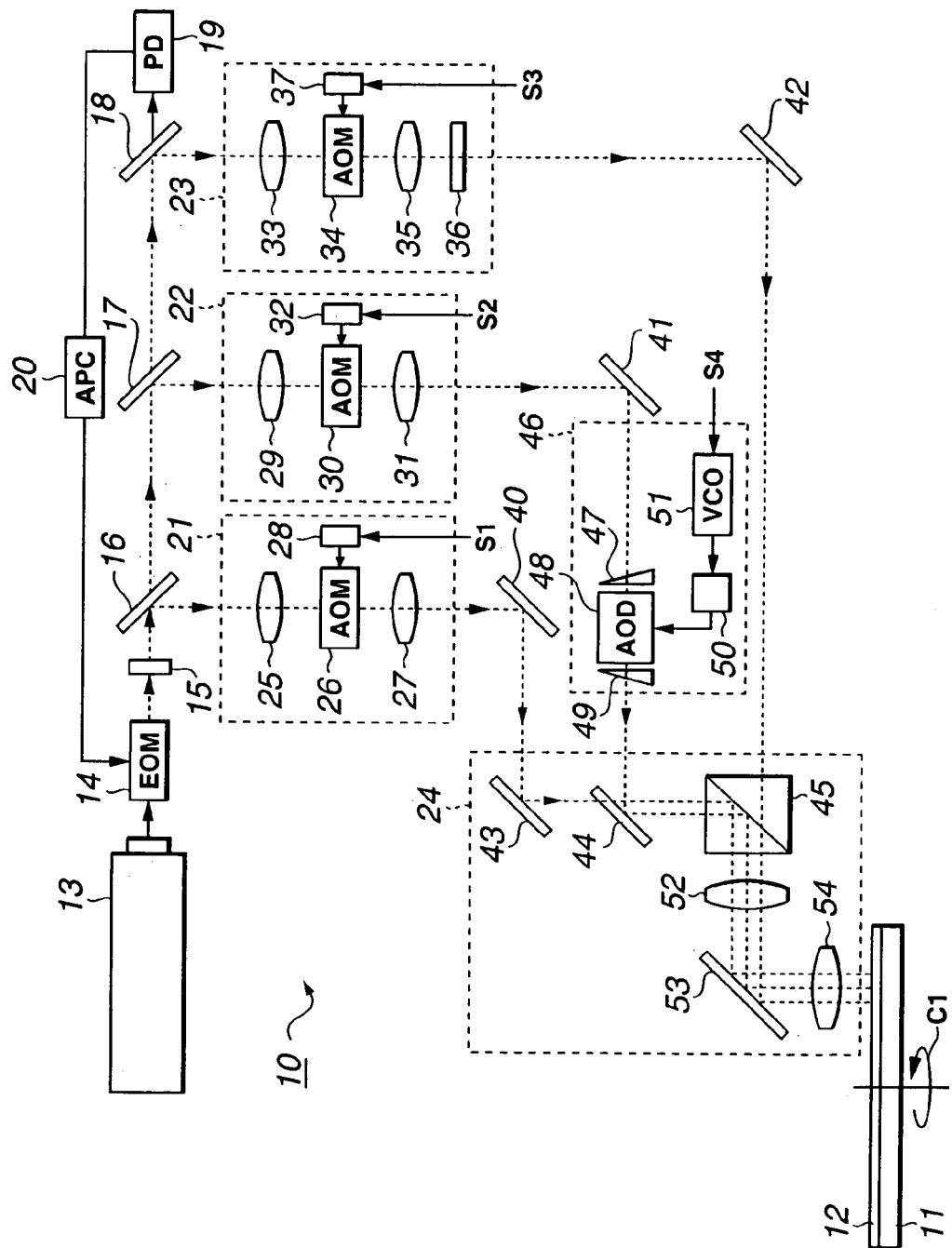
FIG. 5 is a block diagram showing schematics of an optical system an a typical laser cutting device used in the preparation of an optical recording medium and a master disc for the preparation of the optical recording medium according to the present invention.

A laser cutting device 10, shown in FIG. 5, is used for exposing a photoresist 12, coated on a glass substrate 11, to light to form a latent image. When a latent image is formed by the laser cutting device 10 on the photoresist 12, the glass substrate 11, coated with the photoresist 12, is mounted on a rotational driving unit mounted in turn on a movable optical table. When the photoresist 12 is to be exposed to light, the glass substrate 11 is run in rtation by the rotational driving unit, as indicated by arrow C1, so that the entire surface of the photoresist 12 will be exposed to light to a desired pattern, while the glass substrate 11 is translated by the movable optical table.

With the present laser cutting device 10, the photoresist 12 can be exposed to light by three exposure light beams, so that a latent image corresponding to the wobbling groove 5, a latent image corresponding to the straight groove 6 and a latent image corresponding to the shallow groove 7 are formed by respective exposure light beams. Specifically, with the present laser cutting device 10, the latent images corresponding to the shallow groove 7, wobbling groove 5 and to the straight groove 6 are formed by first to third exposure light beams, respectively.

This laser cutting device 10 includes a light source 13 for radiating the laser light, an electro-optical modulator (EOM) 14 for adjusting the intensity of the laser light radiated from a light source 13, an analyzer 15 placed on an optical axis of the laser light radiated from the electro-optical modulator 14, a first beam splitter 16 for separating the laser light transmitted through the analyzer 15 into reflected light and transmitted light, a second beam splitter 17 for separating the laser light transmitted through the first beam splitter 16 into reflected light and transmitted light, a third beam splitter 18 for separating the laser light transmitted through the second beam splitter 17 into reflected light and transmitted light, a photodetector PD 19 for detecting the laser light transmitted through the thitd beam splitter 18, and an automatic power controller (APC) 20 for applying a signal electrical field to the electro-optical modulator 14 to adjust the intensity of the laser light radiated from the electro-optical modulator 14.

In the present laser cutting device 10, the laser light radiated from the light source 13 is adjusted to a pre-set intensity by the electro-optical modulator 14, driven by the signal electrical field applied by the automatic power controller 20, before being incident on the analyzer 15. The analyzer 15 transmits only S-polarized light so that the laser light transmitted through this analyzer 15 is S-polarized.

Although the light source 13 may be of any suitable configuration, such a light source radiating the laser light of a shorter wavelength is desirable. Specifically, Kr laser radiating the laser light with a wavelength λ of 413 nm or a He—Cd laser emitting the laser light with a wavelength λ of 442 nm is desirable as the light source 13.

The laser light transmitted through the analyzer 15 is first divided by the first beam splitter 16 into the reflected light and the transmitted light. The laser light transmitted through the first beam splitter 16 is divided by the second beam splitter 17 into the reflected light and the transmitted light, while the laser light transmitted through the second beam splitter 17 is divided by the third beam splitter 18 into the reflected light and the transmitted light.

Meanwhile, in this laser cutting device 10, the laser light reflected by the first beam splitter 16 becomes a first exposure light beam, whilst the laser light reflected by the second beam splitter 17 becomes a second exposure light beam and the laser light reflected by the third beam splitter 18 becomes a third exposure light beam.

The laser light transmitting through the third beam splitter 18 has its light intensity detected by the photodetector 19 and a signal corresponding to the light intensity is sent from the photodetector 19 to the automatic power controller 20. Responsive to a signal, sent from the photodetector 19, the automatic power controller 20 adjusts the signal electrical fiield applied to the electro-optical modulator 14 so that the light intensity as detected by the photodetector 19 will be constant at a pre-set level. This effects automatic light power control (APC) which will provide for a constant light intensity of the laser light radiated from the electro-optical modulator 14 to achieve a stable laser light beam with lesser noise.

The laser cutting device 10 also includes a first modulating optical system 21 for modulating the intensity of the laser light reflected by the first beam splitter 16, a second modulating optical system 22 for modulating the intensity of the laser light reflected by the second beam splitter 18, and an optical system 24 for re-synthesizing the respective laser light beams, modulated for light intensity by the first to third modulating optical systems 21 to 23, for converging the re-synthesized light beams on the photoresist 12.

The first exposure light beam, reflected by the first beam splitter 16, is led to the first modulating optical system 21 and modulated in light intensity by the first modulating optical system 21. Similarly, the second exposure light beam, reflected by the second beam splitter 17, is led to the second modulating optical system 22, and thereby modulated in light intensity, while the third exposure light beam, reflected by the third beam splitter 18, is led to the third modulating optical system 23 and thereby modulated in light intensity.

Specifically, the first exposure light beam incident on the first modulating optical system 21 is converged by a light converging lens 25 to fall on an acousto-optical modulator 26 so as to be thereby modulated in light intensity for matching with a desired light exposure pattern. An acousto-optical element used for the acousto-optical modulator 26 may, for example, be formed of tellurium oxide (TeO$_2$). The first exposure light beam, modulated in light intensity by the acousto-optical modulator 26, is collimated by a collimator lens 27 so as to be radiated from the first modulating optical system 21.

The acousto-optical modulator 26 is fitted with a actuating driver 28 for driving the acousto-optical modulator 26. During light exposure of the photoresist 12, a signal S1 in agreement with a desired light exposure pattern is input to the actuating driver 28 so that the acousto-optical modulator 26 is driven by the actuating driver 28 in accordance with the signal S1 and modulated in light intensity with respect to the first exposure light beam.

Specifically, if a latent image of a groove pattern matched to the shallow groove 7 of a pre-set depth is to be formed in the photoresist 12, a DC signal of a pre-set level is applied to the actuating driver 28, so that the acousto-optical modulator 26 is driven by the actuating driver 28 responsive to this DC signal. This modulates the first exposure light beam in light intensity in keeping with the desired groove pattern.

The second exposure light beam, incident on the second modulating optical system 22, is converged by a converging lens 29 to fall on an acousto-optical modulator 30 so as to be thereby modulated in light intensity in agreement with the desired exposure light pattern. An acousto-optical modulator used for the acousto-optical modulator 30 is desirably an acousto-optical modulator formed e.g., of telluruim oxide TeO$_2$. The second exposure light beam, modulated in ligt intensity by the acousto-optical modulator 30, is collimated by a collimator lens 31 so as to be radiated from the second modulating optical system 22.

The acousto-optical modulator 30 is fitted with a actuating driver 32 for driving the acousto-optical modulator 30. During light exposure of the photoresist, a signal S2 matched to the desired light exposure pattern is input to the actuating driver 32. Responsive to this signal S2, the acousto-optical modulator 30 is driven by the actuating driver 32 to light-intensity modulate the second exposure light beam.

Specifically, when forming a latent image of a groove pattern corresponding to a wobbling groove 5 of a pre-set depth in the photoresist 12, a DC signal of a constant level is input to the actuating driver 32 so that the acousto-optical modulator 30 is driven by the actuating driver 32 responsive to the DC signal. This light-intensity-modulates the second exposure light beam in agreement with a desired groove pattern.

On the other hand, a third esposure light beam, incident on the third modulating optical system 23, is converged by a light converging lens 33 to fall on an acousto-optical modulator 34 so as to be thereby light-intensity-modulated in meeting with the desired light exposure pattern. As an acousto-optical element used for the acousto-optical modulator 34, such an element composed of, for example, tellurium oxide TeO$_2$, is desirable. The third exposure light beam, light-intensity-modulated by the acousto-optical modulator 34, is collimated by a collimator lens 35 and transmitted through a λ/2 wavelength plate 36, whereby it has its direction of polarization rotated by 90° and is radiated from the third modulating optical system.

On the acousto-optical modulator 34 is mounted an actuating driver 37 for driving the acousto-optical modulator 34. During light exposure of the photoresist 12, a signal S3 corresponding to a desired light exposure pattern is input to the actuating driver 37. The acousto-optical modulator 34 is actuated by the actuating driver 37, responsive to the signal S3, to light-intensity-modulate the third exposure light beam.

Specifically, if a latent image of the groove pattern corresponding to the straight groove 6 of a pre-set depth is to be formed in the photoresist 12, a DC signal is input to the actuating driver 37, so that the acousto-optical modulator 34 is driven by the actuating driver 37 responsive to this DC signal. This light-intensity-modulates the third exposure light beam in meeting with the desired groove pattern.

Meanwhile, the acousto-optical modulators (AOMs) 26, 30, 34 exploit the fact that the light intensity of the first-order diffracted light in Bragg's diffraction is approximately proportionate to the ultrasonic power, and modulates the ultrasonic power based on recording signals to modulate the laser light. These acousto-optical modulators 26, 30, 34 and the light source 13 are arranged to satisfy the Bragg's condition 2d sin θ=nλ, where d is the lattice interval, λ is the wavelength of the laser light and θ is an angle in an integer number defined between the laser light and the lattice plane.

The first exposure light beam is light-intensity-modulated by the first modulating optical system 21, while the second and third exposure light beams are light-intensity-modulated by the second and third modulating optical systems 22, 23, respectively. The first and second exposure light beams, radiated from the first and second modulating optical system 21, 22, remain S-polarized, whilst the third exposure light beam, radiated from the third modulating optical system 23, has its direction of light polarization rotated by 90° by being transmitted through the λ/2 wavelength plate 36, so that it is P-polarized.

The first exposure light beam, radiated from the first modulating optical system 21, is reflected by a mirror 40 and is caused to travel horizontally in parallel on the movable optical table. Similarly, the third exposure light beam, radiated from the third modulating optical system 23, is reflected by a mirror 42 and is caused to travel horizontally in parallel on the movable optical table.

The first expossure light beam, radiated from the first modulating optical system 21 and caused to travel horizontally in parallel on the movable optical table, is reflected by the mirror 43 and has its proceeding direction warped by 90° so as to fall via a half-mirror 44 on the polarizing beam splitter 45. The third exposure light beam radiated from the third modulating optical system 23 and caused to travel horizontally in parallel on the movable optical table is directly incident on the polarizing beam splitter 45.

The role of a deflecting optical system 46 is to optically deflect the second exposure light beam so as to accommodate the wobblig of the wobbling groove 5. That is, the second exposure light beam, radiated from the second modulating optical system 22 to fall on the deflecting optical system 46, falls on an acousto-optical deflector (AOD) 48, via wedge prism 47, so as to be optically deflected by the acousto-optical deflector 48 in meeting with a desired light exposure pattern. As an acousto-optical element used for the acousto-optical deflector 48, such an element composed of, for example, tellurium oxide $TeO_2$, is desirable. The second exposure light beam, optically deflected by the acousto-optical deflector 48, is radiated from the deflecting optical system 46 via wedge prism 49.

The role of the wedge prisms 47, 48 is to cause the second exposure light beam to fall on the lattice plane of the acousto-optical element of the acousto-optical deflector 48 and to keep the horizontal height of the light beam unchanged even if the second exposure light beam is optically deflected by the acousto-optical deflector 48. Stated differently, the wedge prism 47, acousto-optical deflector 48 and the wedge prism 49 are arranged so that the lattice plane of the acousto-optical element of the acousto-optical deflector 48 satisfies the Brag condition in connection with the second exposure light beam and so that the horizontal height of the second exposue light beam radiated from the deflecting optical system 46 remains unchanged.

The acousto-optical deflector 48 is fitted with an actuating driver 50 for actuating the acousto-optical deflector 48. The actuating driver 50 is fed with high frequency signals, frequency modulated by a control signal S4, containing the address information, from a voltage-controlled oscillator (VCO). During light exposure of the photoresist 12, a signal corresponding to a desired light exposure pattern is input from the VCO 51 to the actuating driver 50 to actuate the acousto-optical deflector 48 by the actuating driver 50 in meeting with this signal to oprically deflect the second exposure light beam.

Specifically, if the groove is wobbled with e.g., the frequency of 84.672 kHz to add the address information to the groove, a high frequency signal, with a center frequency of, for example, 224 MHz, is frequency modulated with a control signal with the frequency of 84.672 kHz, and is sent from the VCO 51 to the actuating driver 50. The acousto-optical deflector 48 is driven by the actuating driver 50 responsive to this signal to vary the Bragg's angle of the acousto-optical element of the acousto-optical deflector 48 to optically deflect the second exposure light beam in meeting with the wobbling with a frequency of 84.672 kHz.

The second exposure light beam, optically deflected by the deflecting optical system 46 in this manner in meeting with the wobbling of the wobbling groove 5, has its proceeding direction bent by 90° by the half-mirror 44, and then is incident on the polarizing beam splitter 45.

It is noted that the polarizing beam splitter 45 is designed to reflect the S-polarized light and to transmit the P-polarized light. The first exposure light beam, radiated from the first modulating optical system 21, and the second exposure light beam, radiated from the second modulating optical system 22 and optically deflected by the deflecting optical system 46, are S-polarized, whilst the third exposure light beam radiated from the third modulating optical system 23 is P-polarized. So, the first and second exposure light beams are reflected by this polarizing beam splitter 45, whilst the third exposure light beam is transmitted through the polarizing beam splitter 45. This re-synthesizes the first exposure light beam, radiated from the first modulating optical system 21, the second exposure light beam, radiated from the second modulating optical system 22 and optically deflected by the deflecting optical system 46, and the third exposure light beam, radiated from the third modulating optical system 23, so that the respective proceeding direction will be the same.

The first to third exposure light beams, re-synthesized so that the respective proceeding direction will be the same, and radiated in this state from the polarizing beam splitter 45, are adjusted to a pre-set beam diameter by the enlarging lens 52 and reflected by a mirror 53 to an optical lens 54 so as to be thereby converged on the photoresist 12. This exposes the photoresist 12 to light to form a latent image thereon.

The glass substrate 11, coated with the photoresist 12, is translated by the movable optical table so that the glass substrate 11 will be run in rotation by a rotating driving device in the direction indicated by arrow C1, in such a manner that the entire surface of the photoresist 12 will be exposed to light to a desired pattern. The result is that a latent image corresponding to the trajectory of illumination by the first to third exposure light beams is formed on the entire surface of the photoresist 12.

For forming a finer pit or groove pattern, the optical lens 54 for converging the light of the exposure light beam on the photoresist 12 preferably has a larger numerical aperture NA. Specifically, the optical lens with a numerical aperture NA of the order of 0.9 is desirable.

In illuminating the first to third exposure light beams on the photoresist 12, the beam diameters of the first to third exposure light beams may be varied by the enlarging lens 52 to adjust the effective numerical aperture with respect to the optical lens 54. This enables the spot diameters of the first to third exposure light beams to be converged on the surface of the photoresist 12.

Meanwhile, the second exposure light beam incident on the polarizing beam splitter 45 is synthesized on this reflecting surface of this polarizing beam splitter 45 with the third exposure light beam. It is noted that the polarizing beam splitter 45 is arranged so that its reflecting surface forms a moderate angle with respect to the proceeding direction of light radiated after synthesis of the reflecting surface.

Specifically the reflecting angle of the reflecting surface of the polarizing beam splitter 45 is set so that the spacing between a spot of the second exposure light beam and a spot of the third exposure light beam in the radial direction of the glass substrate 11 corresponds to the track pitch. In this manner, the portion of the photoresist 12 in register with the wobbling groove 5 can be exposed to light by the second exposure light beam, at the same time as the portion of the photoresist 12 in register with the straight groove 6 is exposed to light by the third exposure light beam.

The first exposure light beam, reflected by the mirror 43, falls on the polarizing beam splitter via half-mirror 44 and is synthesized by the reflecting surface of the polarizing beam splitter 45 with the second and third exposure light beams. It is to be noted that the mirror 43 is arranged to form a moderate reflecting angle with respect to the proceeding direction of light radiated after synthesis on the reflecting surface.

Specifically, the reflecting angle of the reflecting surface of the mirror 43 is set so as to be disposed between a spot of the second exposure light beam and a spot of the third exposure light beam. This enables exposure to light of the portion of the photoresist 12 in register with the shallow groove 7, that is an area of the photoresist 12 defined between a portion of the photoresist 12 in register with the wobbling groove 5 exposed to light of the second exposure light beam and a portion of the photoresist 12 in register with the straight groove 6 exposed to light of the third exposure light beam.

The above-described laser cutting device 10 has an optical system associated with the first exposure light beam for forming a latent image associated with the shallow groove 7, an optical system associated with the second exposure light beam for forming a latent image associated with the wobbling groove 5 and an optical system associated with the third exposure light beam for forming a latent image associated with the straight groove 6. Thus, using solely this laser cutting device 10, the latent image associated with the shallow groove 7, the latent image associated with the wobbling groove 5 and the latent image associated with the straight groove 6 can be formed collectively. Moreoer, in this laser cutting device 10, the illuminating positions of the first to third exposure light beams can easily be adjusted by adjusting the direction of the polarizing beam splitter 45 for synthesizingt the first to third exposure light beams and the direction of the mirror 43 used for reflecting the first exposure light beam.

Moreover, if, in this laser cutting device 10, the photoresist 12 is to be exposed to light by the first to third exposure light beams, the signal level of the DC signal input to the actuating drivers 28, 32 and 37 is adjusted to adjust the power of the first to third exposure light beams. Specifically, the power of the first exposure light beam is set to a value weaker than that of the power of the second and third exposure light beams. This enables the depth of the latent image for the shallow groove 7 to be shallower than that of the wobbling groove 5 and the straight groove 6.

The bottom surface of the latent image corresponding to the shallow groove 7 is substantially flat. Stated differently, the latent image corresponding to the shallow groove 7 is protruded in a substantially trapezoidal shape from the bottom surface of the latent images of the wobbling groove 5 and the straight groove 6, thus presenting an optimum shape compatible with the ultra-resolution.

Meanwhile, the latent images of the wobbling groove 5, straight groove 6 and the straight groove 6 can be adjusted in width by adjusting the signal level of the DC signals input to the actuating drivers 28, 32 and 37.

<Method for the Preparation of a Magneto-Optical Disc>

Figure 3:
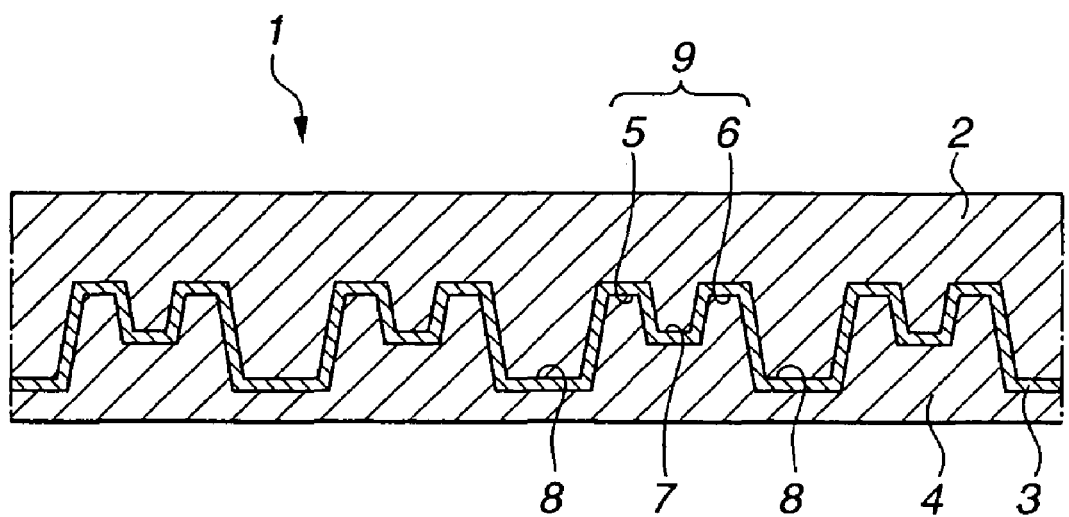
FIG. 3 is a cross-sectional view showing essential portions of a typical magneto-optical disc of the present invention to an enlarged scale.

A specified example of a method for the preparation of a magneto-optical disc 1, shown in FIGS. 3 and 4, is now explained in detail.

In preparing a magneto-optical disc 1, a master disc for the preparation of a recording medium, having a pattern of crests and grooves, corresponding to the wobbling groove 5, straight groove 6 and the shallow groove 7, is prepared, by way of a master disc process.

In this master disc process, a disc-shaped glass substrate 11, having its ssurface polished, is washed and dried. The resulting glass substrate 11 then is coated with the photoresist 12 as the photosensitive material. The photoresist 12 then is exposed to light by the above-described laser cutting device 10 to form latent images corresponding to the wobbling groove 5, straight groove 6 and the shallow groove 7 on the photoresist 12.

In the preparation of a magneto-optical disc for evaluation, a Kr laser radiating the laser light with a wavelength of 413 nm was used as a light source 13 of the laser cutting device 10, whilst an optical lens with a numerical aperture NA of 0.9 was used as the optical lens 54 for converging the first to third exposure light beams on the photoresist 12. Also, light converging lenses 25, 29 and 33, with the focal length of 80 mm, collimator lenses 27, 31 and 35, with the focal length of 120 mm, and an enlarging lens 52, with the focal length of 80 nm, were used.

In exposing the photoresist 12 to light by the above-described laser cutting device 10, the photoresist 12 is first exposed to light by the first to third exposure light beams to form latent images corresponding to the wobbling groove 5, straight groove 6 and the shallow groove 7 on the photoresist 12.

If a latent image corresponding to the wobbling groove 5 is to be formed on the photoresist 12 by the second exposure light beam to form a latent image corresponding to the wobbling groove 5 on the photoresist 12, the second exposure light beam is light-intensity-modulated by the first modulating optical system 22, while being optically deflected by the optical deflecting system 46.

Specifically, a DC signal of a pre-set level is input to the actuating driver 32 and, based on this DC signal, the acousto-optical modulator 30 is actuated by the actuating driver 32 to light-intensity-modulate the second exposure light beam in meeting with the pattern of the wobbling groove 5. Since the wobbling groove 5 is a continuous groove with a constnt depth, the second exposure light beam is light-intensity-modulated so that the the second exposure light beam will be constant in light intensity during the time the latent image corresponding to the wobbling groove 5 is formed.

The second exposure light beam, light-intensity-modulated by the second modulating optical system 22, is optically modulated by the deflecting optical system 46. Specifically, high frequency signals are frequency modulated by a control signal from the VCO 51 and routed to the actuating driver 50, which then actuates the acousto-optical deflector 48 based on the control signal to vary the Bragg's angle of the acousto-optical element of the acousto-optical deflector 48 so as to optically deflect the second exposure light beam.

In preparing a magneto-optical disc for evaluation, as later explained, a high frequency signal with a center frequency of 224 MHz is frequency modulated with a control signal with a frequency of 84.672 kHz and routed from the VCO 51 to the actuating driver 50. Based on this signal, the acousto-optical deflector 48 is actuated by the actuating driver 50 to vary the Bragg's angle of the acousto-optical element of the acousto-optical deflector 48 so as to optically deflect the second exposure light beam so that the position of the light spot of the second exposure light beam converged on the photoresist 12 will be oscillated in the radial direction of the glass substrate 11 with a frequency of 84.672 kHz and an amplitude of ±10 nm.

By converging the second exposure light beam, light-intensity-modulated and optically deflected as described above, on the photoresist 12 by the optical lens 54, the photoresist 12 is exposed to light to form a latent image corresponding to the wobbling groove 5 on the photoresist 12.

By exposing the photoresist 12 to light of the third exposure light beam, at the same time as the photoresist 12 is exposed to light by the second exposure light beam, a latent image corresponding to the straight groove 6 is formed on the photoresist 12.

In forming the latent image corresponding to the straight groove 6 on the photoresist 12 by exposing the photoresist 12 to light of the third exposure light beam, the third exposure light beam is light-intensity-modulated by the third modulating optical system 23.

Specifically, a DC signal of a constant level is input to the actuating driver 37 and, based on this DC signal, the acousto-optical modulator 34 is actuated by the actuating driver 37 to light-intensity-modulate the third exposure light beam in meeting with the pattern of the straight groove 6. Since the straight groove 6 is a continuous groove with a constant depth, the third exposure light beam is light-intensity-modulated so that the second exposure light beam will be constant in light intensity during the time the latent image corresponding to the straight groove 6 is formed.

By converging the thirs exposure light beam, light-intensity-modulated as described above, on the photoresist 12 by the optical lens 54, the photoresist 12 is exposed to light to form a latent image in register with the straight groove 6 on the photoresist 12.

By exposing the photoresist 12 to light of the first exposure light beam, at the same time as the photoresist 12 is exposed to light by the second and third exposure light beams, a latent image corresponding to the shallow groove 7 is formed on the photoresist 12.

In forming the latent image corresponding to the straight groove 6 on the photoresist 12 by exposing the photoresist 12 to light of the first exposure light beam, the first exposure light beam is light-intensity-modulated by the first modulating optical system 23.

Specifically, a DC signal of a constant level is input to the actuating driver 28 and, based on this DC signal, the acousto-optical modulator 26 is actuated by the actuating driver 28 to light-intensity-modulate the first exposure light beam in meeting with the pattern of the shallow groove 7. Since the straight groove 6 is a continuous groove with a constant depth, the first exposure light beam is light-intensity-modulated so that the first exposure light beam will be constant in light intensity during the time the latent image corresponding to the shallow groove 7 is formed.

By converging the first exposure light beam, light-intensity-modulated as described above, on the photoresist 12 by the optical lens 54, the photoresist 12 is exposed to light to form a latent image in register with the shallow groove 7 on the photoresist 12.

In forming the latent image corresponding to the shallow groove 7 on the photoresist 12 by exposing the photoresist 12 to light, the glass substrate 11, coated with the photoresist 12, is run in rotation at a pre-set rpm, while being translated at a pre-set speed.

Specifically, in preparing a magneto-optical disc for evaluation as later explained, the glass substrate 11 is run in rotation so that the relative movement speed as linear velocity between the photoresist 12 and the light spot by the first to third exposure light beams will be 2.00 m/sec. The glass substrate 11 also is translated by the movable optical table in the radial direction of the glass substrate 11 by 1.00 $\mu$m per rotation of the glass substrate 11, that is by a a distance corresponding to the track period.

In exposing the photoresist 12 by the first to third exposure light beams, the DC signal input to the actuating drivers 28, 32, 37 is adjusted in signal level so that the power of the first exposure light beam will be weaker than the power of the second and third exposure light beams. Specifically, the power of the second and third exposure light beams is set to approximately 0.8 mW, with that of the first exposure light beam being set to approximately 0.10 to 0.45 mW.

This forms a latent image corresponding to the shallow groove 7 of a shallower depth than the depth of the latent images corresponding to the wobbling groove 5 and to the straight groove 6.

The bottom surface of the latent image corresponding to the shallow groove 7 is substantially flat. Stated differently, the latent image corresponding to the shallow groove 7 is protruded in a substantially trapezoidal shape from the bottom surface of the latent images of the wobbling groove 5 and the straight groove 6, thus presenting an optimum shape compatible with the ultra-resolution.

In the above-described laser cutting device 10, the angle of reflection of the reflecting surface of the polarizing beam splitter 45 is set so that the interval between the light spot by the second exposure light beam and the light spot by the third exposure light beam in the radial direction of the glass substrate 11 corresponds to the track pitch.

By setting the angle of reflection of the reflecting surface of the polarizing beam splitter 45 in this manner, a latent image for the wobbling groove 5 by the second exposure light beam and that for the straight groove 6 by the third exposure light beam are formed in a double spiral configuration. Stated differently, relative positioning of the wobbling groove 5 and the straight groove 6 is by adjusting the direction of the polarizing beam splitter 45.

Moreover, in the present laser cutting device 10, the angle of reflection of the reflecting surface of the mirror 45 is set so that the spot of the first exposure light beam is located between the spot of the second exposure light beam and the spot of the third exposure light beam.

By setting the angle of reflection of the reflecting surface of the mirror 43 in this manner, a latent image for the shallow groove 7, formed by the first exposure light beam, is formed between a latent image for the wobbling groove 5, formed by the third beam, and a latent image for the straight groove 6, formed by the third beam. In other words, relative positioning between the shallow groove 7 and the deep groove 9 is by adjusting the orientation of the mirror 43.

By exposing the photoresist 12 to light by the first to third exposure light beams, a latent image for the wobbling groove 5, a latent image for the straight groove 6 and a latent image for the straight groove 6 are formed in a double spiral configuration in the photoresist 12.

After forming the latent images in the photoresist 12 as described above, the glass substrate 11 is set on a turntable of a developer with the surface of the photoresist 12 coated with the photoresist 12 facing upwards. This turntable is rotated to rotate the glass substrate 11 and a developing solution is dripped on the photoresist 12 by way of developing processing to form a pattern of crests and grooves in register with the wobbling groove 5, straight groove 6 and the shallow groove 7 on the glass substrate 11.

An electrifying film of, for example, Ni, is then formed by an electroless method on the pattern of crests and grooves. The glass substrate 11, now carrying the electrifying film, is mounted on an eletrocasting device and a plating layer of e.g., Ni, is formed to a thickness of 300±5 $\mu$m on the electrifying film by the electro-plating method. The plating layer then is peeled off and the plating so peeled off is rinsed e.g., with acetone to remove the photoresist 12 left on the surface of the photoresist 12 on which has been transcribed the crest and groove pattern.

The above process completes the master disc for the preparation of the optical recording medium, comprised of the glass substrate 11 and the pattern of crests ad grooves formed thereon as a plating, that is a master disc carrying a pattern of crests and grooves corresponding to the wobbling groove 5, straight groove 6 and the shallow groove 7.

Meanwhile, the master disc for the preparation of the optical recording medium is a master disc for the preparation of the optical recording medium according to the present invention. That is, the master disc for the preparation of an optical recording medium having a groove formed along a recording track has, as a crest-and-groove pattern corresponding to such groove, a first groove pattern and a second groove pattern of a first depth x, describing a double helix, and a third groove pattern having a second depth y shallower than the first depth x, and which is formed between the first and second groove patterns describing the double helix.

Then, using the photopolymer method (so-called 2P method), a disc substrate, on which has been transcribed the surface shape of a master disc for the preparation of an optical recording medium, is prepared.

Specifically, a photopolymer layer is formed by smoothly coating a photopolymer on a surface of the master disc for the preparation of the optical recording medium. A base plate then is affixed tightly to the photopolymer layer as fine dust or foam is prevented from intruding into the photopolymer layer. As the base plate, a polymethyl methacrylate base plate, 1.2 mm in thickness, with a refractive index of 1.49, is used.

The UV light then is illuminated to cure the photopolymer and the master disc for the preparation of the optical recording medium then is peeled off to complete a disc substrate 2 on which has been transcribed the surface shape of the master disc for the preparation of the optical recording medium.

In the above-described embodiment, the disc substrate 2 is prepared using the 2P method so that the pattern of crests and grooves formed on the master disc for the preparation of the optical recording medium will be transcribed more accurately to the disc substrate 2. However, for mass-producing the disc substrates 2, a disc substrate 2 may also be prepared by injection molding using a transparent resin material, such as polymethyl methacrylate or polycarbonate.

Then, by way of the film-forming process, a recording layer 3 and a protective layer 4 are formed on the disc substrate 2 on which has been transcribed the surface shape of the master disc for the preparation of the optical recording medium. Specifically, a first dielectric film of e.g., SiN, a perpendicular magnetic recording film of e.g., TeFeCO alloys, and a second dielectric film of e.g., SiN, are sequentially formed by sputtering on a surface of the disc substrate 2 carrying the pattern of crests and grooves. A light reflecting film of e.g., Al is formed by vapor deposition on the second dielectric film to form a recording film 3 comprised of the first dielectric film, perpendicular magnetic recording film and the second dielectric film. On this recording layer 3 is coated a UV resin by the spin coating method and UV rays are illuminated on the UV curable resin for curing, thereby forming the protective layer 4.

The above process completes the magneto-optical disc 1.

<Evaluation of Magneto-Optical Disc>

By the method for preparation, as described above, plural magneto-optical discs or evaluation with respective different first depths of the wobbling groove 5 and the straight groove 6 (deep groove 9) and respective different second depths y of the shallow groove 7, were prepared, and evaluations thereof was made. The results of the evaluation are now explained.

The first depth x was controlled by varying the thickness of the photoresist 12 formed on the glass substrate 11, whilst the second depth y was controlled by controlling the power of the first to third exposure light beams.

In evaluating the magneto-optical discs for evaluation, plural master discs for the preparation of optical recording mediums were prepared as the first and second depths x, y were varied. The master discs of these optical recording mediums were checked by an atomic force microscope (AFM) and measurements were made of the width and the first depth x of the pattern of crests and grooves corresponding to the deep groove 9 and the width and the second depth y of the pattern of crests and grooves corresponding to the shallow groove 7.

As a result, it was found that the width of the bottom surface was approximately 400 nm, the width of the upper surface was approximately 240 nm, with the first depth x being approximately 148 to 241 nm, while the shallow groove 7 has a substantially flat bottom shape, with its width being approximately 100 nm and with the second depth y being approximately 97 to 160 nm.

Finally, a magneto-optical disc for evaluation was prepared by the 2P method, using the master discs for these optical recording mediums. The material of the disc substrate of the magneto-optical discs for evaluation used was polymethylmethacrylate with the refractive index of 1.49.

Measurements were made of the push-pull signals and the cross-track signals of plural magneto-optical discs for evaluation with respective different first depths x of the deep groove 9 and with respective different dewpths y of the shallow grooves. For measurung the push-pull signals and the cross-track signals, an optical pickup with a wavelength of the laser light λ of 650 nm and the numerical aperture NA of the optical lens of 0.52 was used.

Of these magneto-optical discs for evaluation, the phase depth x of the deep groove 9 and the phase depth y of the shallow groove 7, with the pushpull signal amplitude ratio and the cross-track signal amplitude ratio of not less than 0.14 and not less than 0.06, respectively, were checked.

Figure 6:
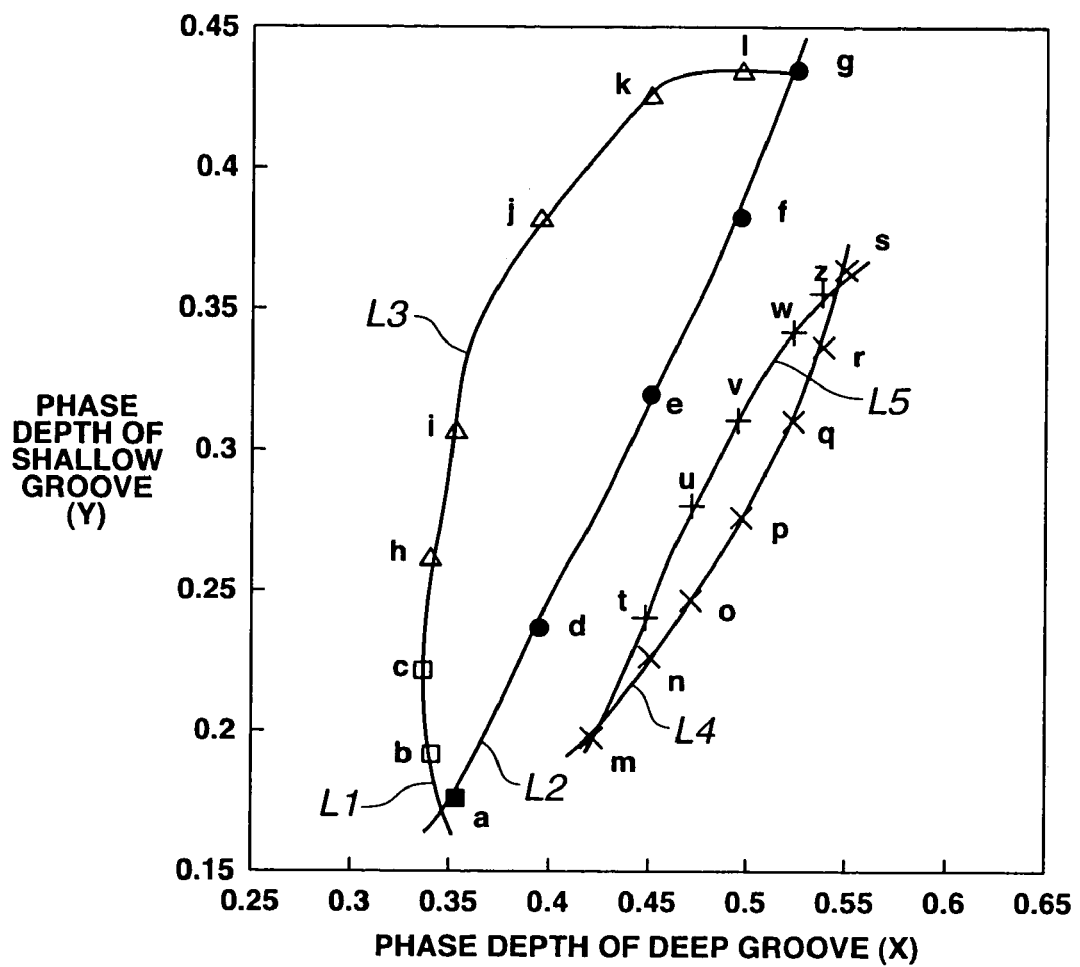
FIG. 6 is a graph showing the relation between the phase depth of a deep groove and a shallow groove in case the push-pull signal amplitude ratio is not less than 0.14 and the cross-track signal amplitude ratio is not less than 0.6.

It has been found, as a result, that the push-pull signal amplitude ratio and the cross-track signal amplitude ratio of not less than 0.14 and not less than 006, respectively, may be achieved if within an area surrounded by points a, b, c, d, e, f, g, h, i, j, k and l or an area surrounded by points m, n, o, p, q, r, s, t, u, v, w and z in FIG. 6.

In FIG. 6, the ordinate denotes the phase depth of the shallow groove 7, whilst the abscissa denotes the phase depth X of the deep groove 6, that is the wobbling groove 5 and the straight groove 6.

Meanwhile, an approximate straight line L1 interconnecting points a, b and c is represented by the following equation 2-1, whilst an approximate straight line L2 interconnecting points a, d, e, f and g is represented by the following equation 2-2 and an approximate straight line L3 interconnecting points c, h, i, j, k, l and g is represented by the following equation 2-3:

$$Y=36.9189-208.0190X+294.3845X^2 \quad (2\text{-}1)$$

$$Y=-1.2977+8.2017X-15.8226X^2+12.3273X^3 \quad (2\text{-}2)$$

$$Y=-214.05681+2423.29342X-10933.24673X^2+24597.79851X^3-27576.99399X^4+12319.79865X^5 \quad (2\text{-}3)$$

On the other hand, an approximate straight line L4 interconnecting the points m, n, o, p, q, r and s and an approximate straight line L4 interconnecting the points m, t, u, v, w, z and s are represented by the following equations 2-4 and 2-5, respectively:

$$Y=-4.6463+30.2156X-64.3100X^2+47.1308X^3 \quad (2\text{-}4)$$

$$Y=2.7669-20.0529X+48.0353X^2-35.4870X^3 \quad (2\text{-}5)$$

Therefore, an area surrounded by the points a, b, c, d, e, f, g, h, i, j, k and l may be approximately represented as an area satisfying the following equations 3-1, 3-2 and 3-3:

$$Y\geq 36.9189-208.0190X+294.3845X^2 \quad (3\text{-}1)$$

$$Y\geq -1.2977+8.2017X-15.8226X^2+12.3273X^3 \quad (3\text{-}2)$$

$$Y\leq -214.05681+2423.29342X-10933.24673X^2+24597.79851X^3-27576.99399X^4+12319.79865X^5 \quad (3\text{-}3)$$

On the other hand, an area surrounded by the points m, n, o, p, q, r, s, t, u, v, w and z may be approximately represented as an area satisfying the following equations 3-4 and 3-5:

$$Y\geq -4.6463+30.2156X-64.3100X^2+47.1308X^3 \quad (3\text{-}4)$$

$$Y\leq 2.7669-20.0529X+48.0353X^2-35.4870X^3 \quad (3\text{-}5)$$

This is tantamount to saying that if, with the phase depth X of the deep groove 9 and with the phase depth Y of the shallow groove 7, the deep groove 9 and the shallow groove 7 are formed to satisfy the above equations 3-1 to 3-3 or the equations 3-4 and 3-5, the push-pull signal amplitude ratio not less than 0.14 and the cross-track signal amplitude ratio not less than 0.06 may be achieved, thus enabling stable tracking servo and seek.

Of these magneto-optical discs for evaluation, the phase depth x of the deep groove 9 and the phase depth Y of the shallow groove 7, with the pushpull signal amplitude ratio and the cross-track signal amplitude ratio being not less than 0.06 and not less than 0.14, respectively, were checked.

Figure 7:
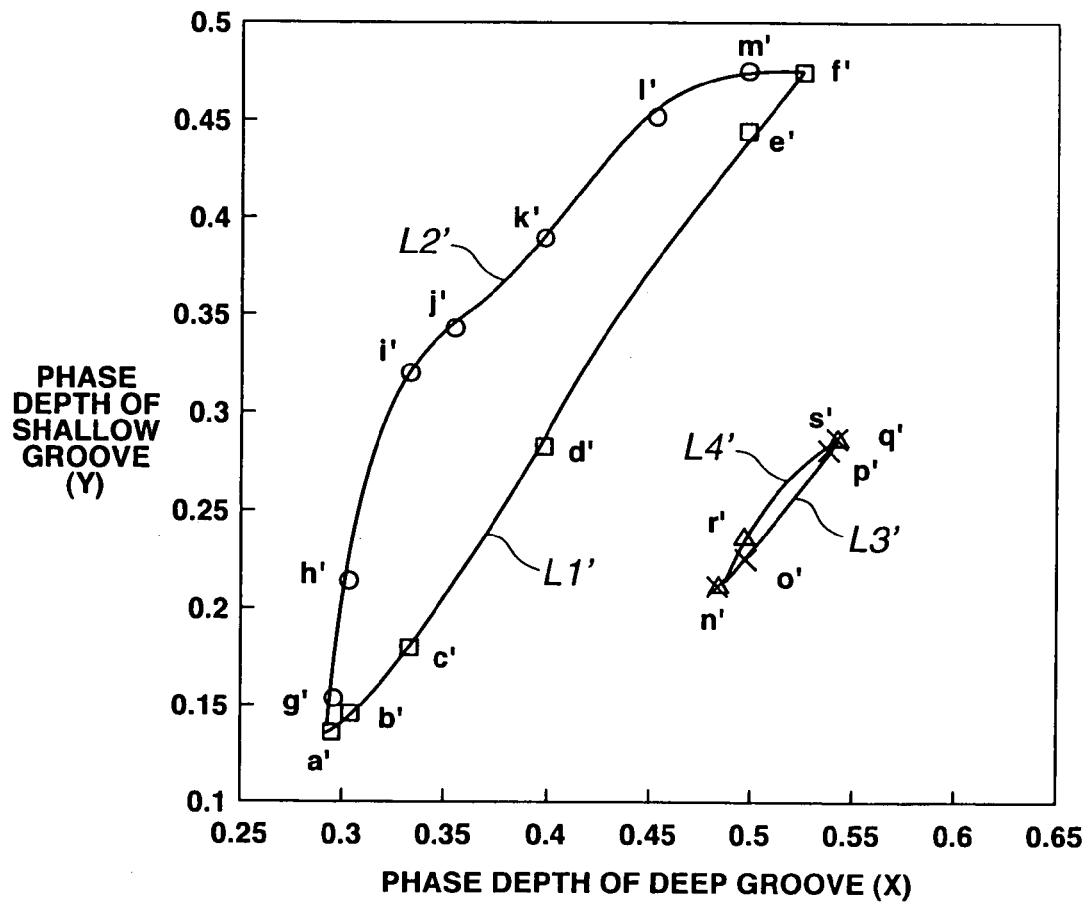
FIG. 7 is a graph showing the relation between the phase depth of a deep groove and a shallow groove in case the push-pull signal amplitude ratio is not less than 0.06 and the cross-track signal amplitude ratio is not less than 0.14.

It has been found, as a result, that the push-pull signal amplitude ratio and the cross-track signal amplitude ratio of not less than 0.06 and not less than 0.14, respectively, may be achieved if within an area surrounded by points a', b', c', d', e', f', g', h', i', j', k', l' and m' or an area surrounded by points n', o', p', q', r' and s' in FIG. 7.

In this figure, the ordinate denotes the phase depth of the shallow groove 7, whilst the abscissa denotes the phase depth X of the wobbling groove 5 and the straight groove 6, that is the deep groove 6.

Meanwhile, an approximate straight line L1' interconnecting points a', b', c', d', e' and f' is represented by the following equation 2-6, whilst an approximate straight line L2' interconnecting points a', g', h', i', j', k', l', m' and f' is represented by the following equation 2-7:

$$Y=0.8680-7.3968X+21.8561X^2-17.5125X^3 \quad (2\text{-}6)$$

$$Y=-261.77076+3646.50412X-20988.26504X^2+63944.54992X^3-108758.21706X^4+97951.29191X^5-36518.20328X^6 \quad (2\text{-}7)$$

On the other hand, an approximate straight line L3' interconnecting the points n', o', p' and q' and an approximate straight line L4' interconnecting the points n', r', s' and q' are represented by the following equation 2-8 and 2-9, respectively:

$$Y=10.2606-60.3765X+118.5901X^2-75.9408X^3 \quad (2\text{-}8)$$

$$Y=-6.8296+29.9281X-38.6228X^2+14.0747X^3 \quad (2\text{-}9)$$

Therefore, an area surrounded by the points a', b', c', d', e', f', g', h', i', j', k' and l' may be approximately represented as an area satisfying the following equations 3-6 and 3-7:

$$Y\geq 0.8680-7.3968X+21.8561X^2-17.5125X^3 \quad (3\text{-}6)$$

$$Y\leq -261.77076+3645.50412X-20988.26504X^2+63944.54992X^3-108758.21706X^4+97951.29191X^5-36518.20328X^6 \quad (3\text{-}7)$$

On the other hand, an area surrounded by the points n, o, p, q, r and s may be approximately represented as an area satisfying the following equations 3-8 and 3-9:

$$Y\geq 10.2606-60.3765X+118.5901X^2-75.9408X^3 \quad (3\text{-}8)$$

$$Y\leq -6.8296+29.9281X-38.6228X^2+14.0747X^3 \quad (3\text{-}9)$$

This is tantamount to saying that if, with the phase depth X of the deep groove 9 and with the phase depth Y of the shallow groove 7, the deep groove 9 and the shallow groove 7 are formed to satisfy the above equations 3-6 and 3-7 or the equations 3-8 and 3-9, the push-pull signal amplitude ratio not less than 0.06 and the cross-track signal amplitude ratio not less than 0.14 may be achieved, thus enabling stable tracking servo and seek.

Since the wavelength λ of the laser light is 650 nm and the numerical aperture NA of the optical lens is 0.52, the cut-off frequency of the optical pickup 2NA/λ is 1600 mm$^{-1}$. On the other hand, since the track pitch of the magneto-optical disc for evaluation is 0.50 μm, its spatial frequency is 2000 mm$^{-1}$. Thus, in the magneto-optical disc for evaluation, the spatial frequency of the track pitch is larger than the cut-off frequency of the optical pickup 2NA/λ.

Heretofore, if the spatial frequency of the track pitch is larger in this manner than the cut-off frequency of the optical pickup 2NA/λ, sufficient levels of the pushpull signals or the cross-track signals cannot be produced, with the result that stable tracking servo or seek cannot be achieved.

However, with the magneto-optical disc 1 of the present invention in which, by forming the wobbling groove 5 and the straight groove 6, as the deep groove 9, and the shallow groove 7, shallower than this deep groove 9, such as to satisfy the above equations 3-1 to 3-3 or the above equations 3-4 and 3-5, the spatial frequency of the track pitch can be larger than the cut-off frequency 2NA/λ of the optical pickup, even though sufficient levels of the push-pull signals or the cross-track signals are maintained, as may be apparent from the results of the above experiments. That is, by applying the present invention, the track pitch may be narrower to improve the recording density appreciably, despite the fact that sufficient levels of the pushpull signals or the cross-track signals are maintained.

Moreover, with the magneto-optical disc 1 of the present invention in which, by forming the wobbling groove 5 and the straight groove 6, as the deep groove 9, and the shallow groove 7, shallower than this deep groove 9, such as to satisfy the above equations 3-6 and 3-7 or the above equations 3-8 and 3-9, the spatial frequency of the track pitch can be larger than the cut-off frequency 2NA/λ of the optical pickup, even though sufficient levels of the push-pull signals or the cross-track signals are maintained, as may be apparent from the results of the above experiments. That is, by applying the present invention, the track pitch may be narrower to improve the recording density appreciably, despite the fact that sufficient levels of the pushpull signals or the cross-track signals are maintained.

Figure 8:
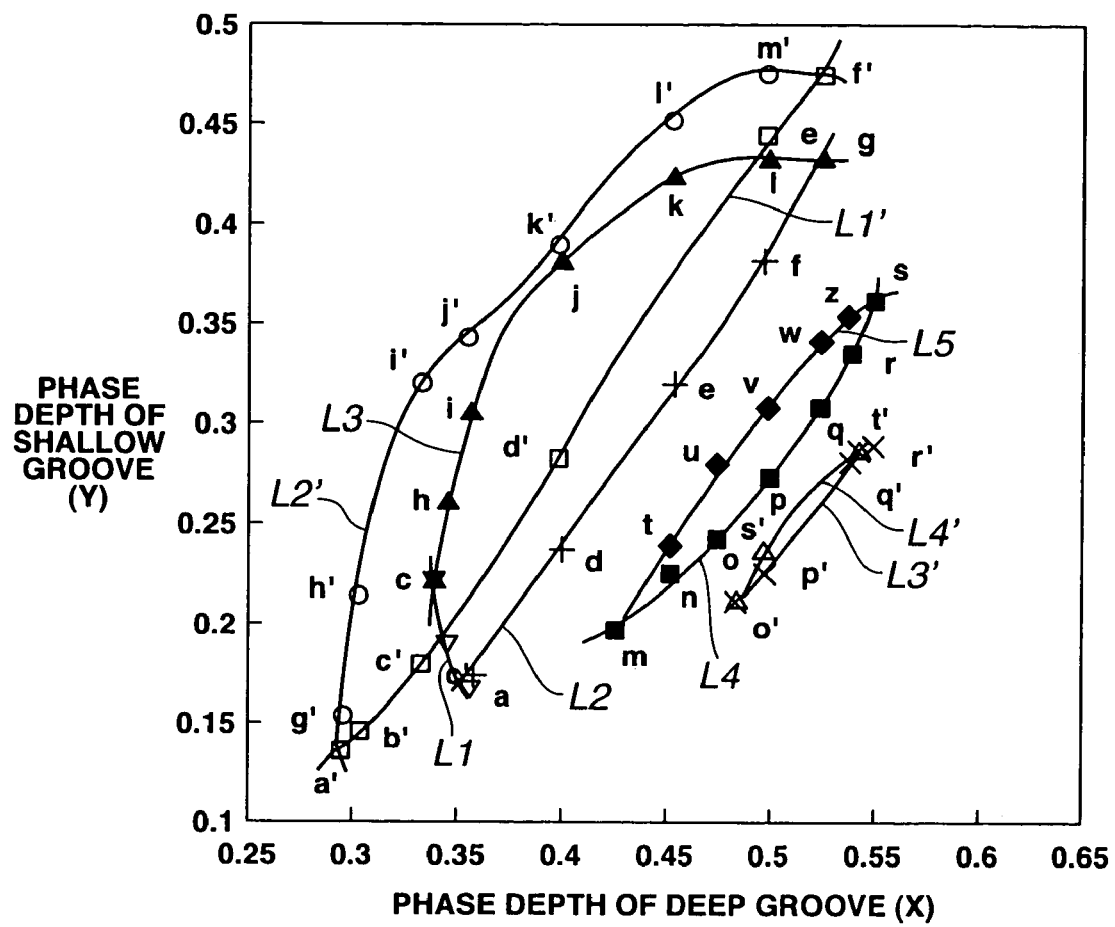
FIG. 8 is a graph showing the relation between the phase depth of a deep groove and a shallow groove and also showing straight lines L1 to L3 in FIG. 6 and straight lines L1' and L2' in FIG. 7.

In addition, as shown in FIG. 8, from these magneto-optical discs for evaluation, an area in which the push-pull signal amplitude ratio is not less than 0.14 and the cross-track signal amplitude ratio is not less than 0.14 may approximately be represented as an area satisfying the following equations 3-10 to 3-12:

$$Y \geq 0.8680 - 7.3968X + 21.8561X^2 - 17.5125X^3 \quad (3\text{-}10)$$

$$Y \geq 36.9189 - 208.0190X + 294.3845X^2 \quad (3\text{-}11)$$

$$Y \leq -214.05681 + 2423.29342X - 10933.24673X^2 + 24597.79851X^3 - 27576.99399X^4 + 12319.79865X^5 \quad (3\text{-}12).$$

FIG. 9 is a graph showing both straight lines L1 to L3 shown in FIG. 6 and straight lines L1' and L2' shown in FIG. 7.

This is tantamount to saying that, if, with the phase depth X of the deep groove 9 and with the phase depth Y of the shallow groove 7, the deep groove 9 and the shallow groove 7 are formed to satisfy the above equations 3-10 to 3-12, the push-pull signal amplitude ratio not less than 0.14 and the cross-track signal amplitude ratio not less than 0.14 may be achieved, thus enabling more stable tracking servo and seek.

The magneto-optical recording medium of the present invention has so far been explained taking the magneto-optical disc 1 as an example. This magneto-optical disc 1 is recorded and/or reproduced by an optical recording and/or reproducing apparatus according to the present invention. That is, the present optical recording and/or reproducing apparatus uses a magneto-optical recording medium as a recording medium and effects tracking servo and track seek using push-pull signals and cross-talk signals, respectively.

Specifically, the present optical recording and/or reproducing apparatus uses the above-mentioned magneto-optical disc 1 as the recording medium and also uses a push-pull method for tracking servo to record and/or reproduce the magneto-optical disc 1. Meanwhile, the recording and/or reproducing apparatus according to the present invention is configured similarly to the conventional optical recording and/or reproducing apparatus except using the magneto-optical recording medium embodying the present invention as the recording medium, using push-pull signals for tracking servo and also except using cross-track signals for track seek.

Thus, in the recording and/or reproducing apparatus according to the present invention, sufficient levels of the push-pull signals, cross-track signals and the pit modulation factor may be obtained to enable stable signal reproduction.

It should be noted that the present invention can be applied extensively to an optical recording medium having a groove extending along a recording track, and to a master disc for the preparation of the optical recording medium, and that the optical recording medium according to the present invention may be any one of a replay-only optical recording medium, an optical recording medium capable of repeated data rewriting and an optical recording medium on which data can be written once but cannot be erased.

There is also no limitation to the data recording method, such that the optical recording medium according to the present invention may be any one of a replay-only optical recording medium, on which data has been written at the outset by e.g., embossing pits, a magneto-optical disc recording medium for recording data exploiting the photo-magnetic effect, and a phase-change optical recording medium for recording data using phase changes of the recording layer.

The present invention is also applicable extensively to an optical recording medium in the recording area of which a groove is formed, and to a master disc used for the preparation of the optical recording medium. That is, the groove may be formed in the entire recording area or an area in which data is recorded by embossing pits without forming the groove may be present in the recording area.

The present invention may also be otherwise modified without changing the gist of the invention without being limited to the above-described embodiments.

What is claimed is:

1. A master disc for the preparation of an optical recording medium having a groove formed along a recording track and illuminated by the light with a wavelength λ for recording and/or reproduction, comprising:

a substrate having formed thereon a crest-and-groove pattern corresponding to said groove, a first groove pattern and a second groove pattern are formed to a first depth to describe a double helix and wherein a third groove pattern having a second depth shallower than said first depth is formed between said first and second groove patterns describing double helices, wherein said master disc being configured to receive thereon the optical recording medium which is subsequently removed although retaining a transcription of the crest-and-groove pattern and at least one of said first and second groove patterns is a wobbling groove pattern formed so that at least a portion thereof is meandered.

2. The master disc for the preparation of an optical recording medium according to claim 1 wherein, if a phase depth of said first and second groove patterns represented by x×n$_x$/λ, x being said first depth and n$_x$ being a refractive index of a medium from the light incident surface to said first and second grooves, is X, and if a phase depth of said third groove pattern represented by y×n$_y$/λ, y being said second depth and n$_y$ being a refractive index of a medium from the light incident surface to said third groove, is Y, said first, second and third groove patterns are set for satisfying the equations (1) to (3) or the equations (4) and (5):

$$Y \geq 36.9189 - 208.0190X + 294.3845X^2 \quad (1)$$

$$Y \geq -1.2977 + 8.2017X - 15.8226X^2 + 12.3273X^3 \quad (2)$$

$$Y \leq -214.05681 + 2423.29342X - 10933.24673X^2 + 24597.79851X^3 - 27576.99399X^4 + 12319.79865X^5 \quad (3)$$

$$Y \geq -4.6463 + 30.2156X - 64.3100X^2 + 47.1308X^3 \quad (4)$$

$$Y \leq 2.7669 - 20.0529X + 48.0353X^2 - 35.4870X^3 \quad (5).$$

3. The master disc for the preparation of an optical recording medium according to claim 1 wherein, if a phase depth of said first and second groove patterns represented by x×n$_x$/λ, x being said first depth and n$_x$ being a refractive index of a medium from the light incident surface to said first and second grooves, is X, and if a phase depth of said third groove pattern represented by y×n$_y$/λ, y being said second depth and n$_y$ being a refractive index of a medium from the light incident surface to said third groove, is Y, said first, second and third groove patterns are set for satisfying the equations (6) and (7) or the equations (8) and (9):

$$Y \geq 0.8680 - 7.3968X + 21.8561X^2 - 17.5125X^3 \quad (6).$$

$$Y \leq -261.77076 + 3646.50412X - 20988.26504X^2 + 63944.54992X^3 - 108758.21706X^4 + 97951.29191X^5 - 36518.20328X^6 \quad (7)$$

$$Y \geq 10.2606 - 60.3765X + 118.5901X^2 - 75.9408X^3 \quad (8)$$

$$Y \leq -6.8296 + 29.9281X - 38.6228X^2 + 14.0747X^3 \quad (9).$$

4. The master disc for the preparation of an optical recording medium according to claim 1 wherein, if a phase depth of said first and second groove patterns represented by x×n$_x$/λ, x being said first depth and n$_x$ being a refractive index of a medium from the light incident surface to said first and second grooves, is X, and if a phase depth of said third groove pattern represented by y×n$_y$/λ, y being said second depth and n$_y$ being a refractive index of a medium from the light incident surface to said third groove, is Y, said first, second and third groove patterns are set for satisfying the equations (10), (11) and (12):

$$Y \geq 0.8680 - 7.3968X + 21.856X^2 - 17.5125X^3 \quad (10)$$

$$Y \geq 36.9189 - 208.0190X + 294.3845X^2 \quad (11)$$

$$Y \leq -214.05681 + 2423.29342X - 10933.24673X^2 + 24597.79851X^3 - 27576.99399X^4 + 12319.79865X^5 \quad (12).$$

5. The master disc for the preparation of an optical recording medium according to claim 1 wherein at least one of said first and second groove patterns is a crest-and-groove pattern corresponding to a wobbling groove formed so that at least a portion thereof is meandered.

6. An optical recording and/or reproducing apparatus for recording and/or reproducing the information by illuminating the light with a wavelength λ on an optical recording medium having a groove formed along a recording track, comprising:
 a light source configured to produce said light with a wavelength λ;
 an optical system configured to orient said light on said optical recording medium; and
 a rotational driving unit configured to hold said optical recording medium, wherein
 said optical recording medium is such a one in which, as said groove, a first groove and a second groove are formed to a first depth to describe a double helix and wherein a third groove having a second depth shallower than said first depth is formed between said first and second groves describing double helices, wherein at least one of said first and second grooves is a wobbling groove formed so that at least a portion thereof is meandered.

7. The optical recording and/or reproducing apparatus according to claim 6 wherein, if a phase depth of said first and second grooves represented by x×n$_x$/λ, x being said first depth and n$_x$ being a refractive index of a medium from the light incident surface to said first and second grooves, is X, and if a phase depth of said third groove represented by y×n$_y$/λ, y being said second depth and n$_y$ being a refractive index of a medium from the light incident surface to said third groove, is Y, said first, second and third grooves are set for satisfying the equations (1) to (3) or the equations (4) and (5):

$$Y \geq 36.9189 - 208.0190X + 294.3845X^2 \quad (1)$$

$$Y \geq -1.2977 + 8.2017X - 15.8226X^2 + 12.3273X^3 \quad (2)$$

$$Y \leq -214.05681 + 2423.29342X - 10933.24673X^2 + 24597.79851X^3 - 27576.99399X^4 + 12319.79865X^5 \quad (3)$$

$$Y \geq -4.6463 + 30.2156X - 64.3100X^2 + 47.1308X^3 \quad (4)$$

$$Y \leq 2.7669 - 20.0529X + 48.0353X^2 - 35.4870X^3 \quad (5).$$

8. The optical recording and/or reproducing apparatus according to claim 6 wherein, if a phase depth of said first and second grooves represented by x×n$_x$/λ, x being said first depth and n$_x$ being a refractive index of a medium from the light incident surface to said first and second grooves, is X, and if a phase depth of said third groove represented by y×n$_y$/λ, y being said second depth and n$_y$ being a refractive index of a medium from the light incident surface to said third groove, is Y, said first, second and third grooves are set for satisfying the equations (6) and (7) or the equations (8) and (9):

$$Y \geq 0.8680 - 7.3968X + 21.8561X^2 - 17.5125X^3 \quad (6)$$

$$Y \leq -261.77076 + 3646.50412X - 20988.26504X^2 + 63944.54992X^3 - 108758.21706X^4 + 97951.29191X^5 - 36518.20328X^6 \quad (7)$$

$$Y \leq 10.2606 - 60.3765X + 118.5901X^2 - 75.9408X^3 \quad (8)$$

$$Y \leq -6.8296 + 29.9281X - 38.6228X^2 + 14.0747X^3 \quad (9).$$

9. The optical recording and/or reproducing apparatus according to claim 6 wherein, if a phase depth of said first and second grooves represented by x×n$_x$/λ, x being said first depth and n$_x$ being a refractive index of a medium from the light incident surface to said first and second grooves, is X, and if a phase depth of said third groove represented by y×n$_y$/λ, y being said second depth and n$_y$ being a refractive index of a medium from the light incident surface to said third groove, is Y, said first, second and third grooves are set for satisfying the equations (10), (11) and (12):

$$Y \geq 0.8680 - 7.3968X + 21.856X^2 - 17.5125X^3 \quad (10)$$

$$Y \geq 36.9189 - 208.0190X + 294.3845X^2 \quad (11)$$

$$Y \leq -214.05681 + 2423.29342X - 10933.24673X^2 + 24597.79851 X^3 - 27576.99399X^4 + 12319.79865X^5 \quad (12).$$

10. The optical recording and/or reproducing apparatus according to claim 6 wherein at least one of said first and second grooves is a wobbling groove formed so that at least a portion thereof is meandered.

11. The optical recording and/or reproducing apparatus according to claim 6 wherein, if the numerical aperture of an optical lens used for recording and/or reproduction is NA, the spatial frequency of the track pitch is larger than the cut-off frequency represented by $2 \times NA/\lambda$.

* * * * *

UNITED STATES PATENT AND TRADEMARK OFFICE
CERTIFICATE OF CORRECTION

PATENT NO. : 6,999,405 B2
APPLICATION NO. : 10/823614
DATED : February 14, 2006
INVENTOR(S) : Sohmei Endoh Page 1 of 1

It is certified that error appears in the above-identified patent and that said Letters Patent is hereby corrected as shown below:

At column 9, line 62, change ""often"" to --"of the"--.

At column 10, line 23, change ""$X^{2-17.5125}X^3$"" to -- "$X^2 17.5125 X^3$"--.

At column 26, line 51, change to ""$\leq$"" to --"$\geq$"--.

Signed and Sealed this

Twenty-eighth Day of November, 2006

JON W. DUDAS
*Director of the United States Patent and Trademark Office*